US012633318B2

(12) United States Patent
Cox

(10) Patent No.: US 12,633,318 B2
(45) Date of Patent: May 19, 2026

(54) SYSTEMS AND METHODS FOR SYNCHRONIZING WORKOUT EQUIPMENT WITH VIDEO FILES

(71) Applicant: iFIT Inc, Logan, UT (US)

(72) Inventor: Kade Cox, Logan, UT (US)

(73) Assignee: iFIT Inc., Logan, UT (US)

( * ) Notice: Subject to any disclaimer, the term of this patent is extended or adjusted under 35 U.S.C. 154(b) by 6 days.

(21) Appl. No.: 18/953,814

(22) Filed: Nov. 20, 2024

(65) Prior Publication Data

US 2025/0078874 A1 Mar. 6, 2025

Related U.S. Application Data

(63) Continuation of application No. 18/091,004, filed on Dec. 29, 2022, now Pat. No. 12,176,009.

(60) Provisional application No. 63/306,251, filed on Feb. 3, 2022, provisional application No. 63/295,419, filed on Dec. 30, 2021.

(51) Int. Cl.
*G11B 27/10* (2006.01)
*A63B 71/06* (2006.01)
*A63B 22/02* (2006.01)

(52) U.S. Cl.
CPC .......... *G11B 27/10* (2013.01); *A63B 71/0622* (2013.01); *A63B 22/02* (2013.01); *A63B 2225/20* (2013.01); *A63B 2225/50* (2013.01)

(58) Field of Classification Search
CPC ............................ G11B 27/10; A63B 71/0622
See application file for complete search history.

(56) References Cited

U.S. PATENT DOCUMENTS 11,058,918 B1 * 7/2021 Watterson .......... A63B 71/0622
11,794,075 B2 * 10/2023 Watterson .......... A63B 71/0686

FOREIGN PATENT DOCUMENTS

WO WO-2017155966 A1 * 9/2017 ............... H04N 5/76
WO WO-2022036160 A1 * 2/2022 ............. G16H 20/30

* cited by examiner

*Primary Examiner* — Mishawn N. Hunter
(74) *Attorney, Agent, or Firm* — Holland & Hart LLP

(57) ABSTRACT

A method for synchronizing exercise equipment with workout video files to reduce latency may include executing a workout video file to display a workout video on a display; retrieving a configuration change command and a configuration change criterion from the workout video file; generating a message comprising the configuration change command and the configuration change criterion; and transmitting, over a communications network, the message to the workout device. The workout device may aggregate the configuration change command and the configuration change criterion into a queue of one or more configuration change commands that is stored in a memory of the workout device; and change operation according to the configuration change command in response to determining the configuration change criterion is satisfied.

20 Claims, 9 Drawing Sheets

| Workout Video File 200 | |
|---|---|
| Video Data 202 | |
| 5 mph | :00 |
| 10% | :30 |
| 6 mph | 2 miles |
| 5% | 1:30 |
| 5 mph | 7 miles |
| 0% | 2:20 |
| 3 mph | 2:40 |

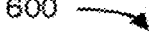
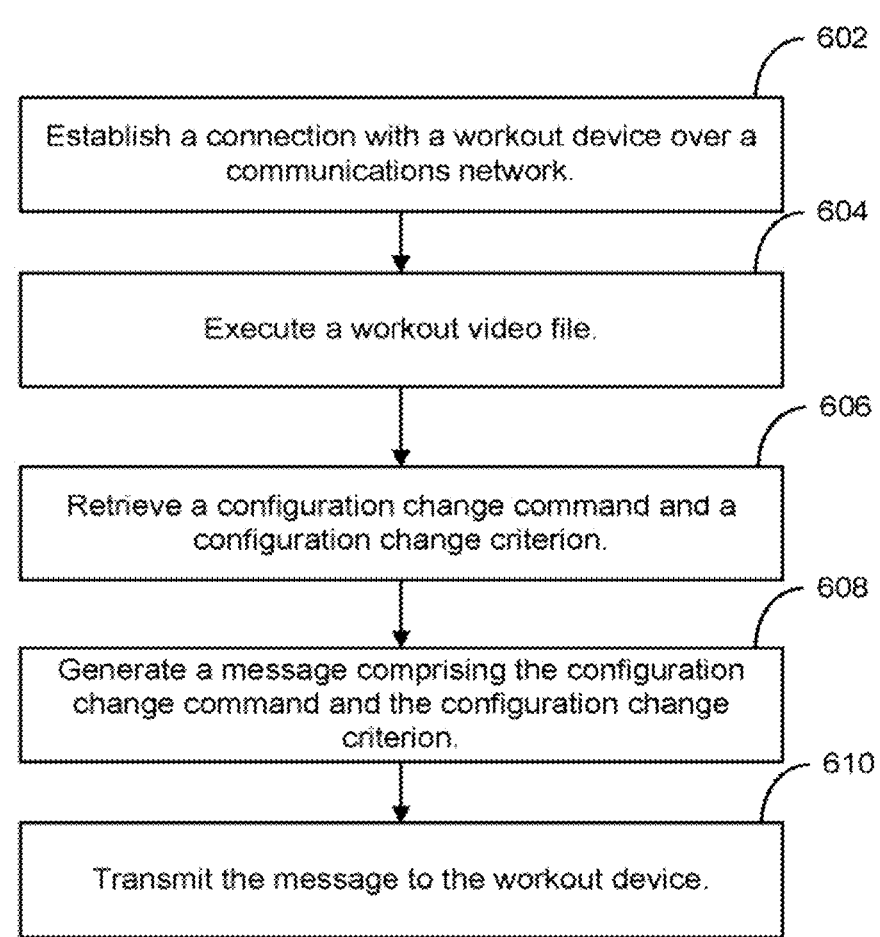
FIG. 6

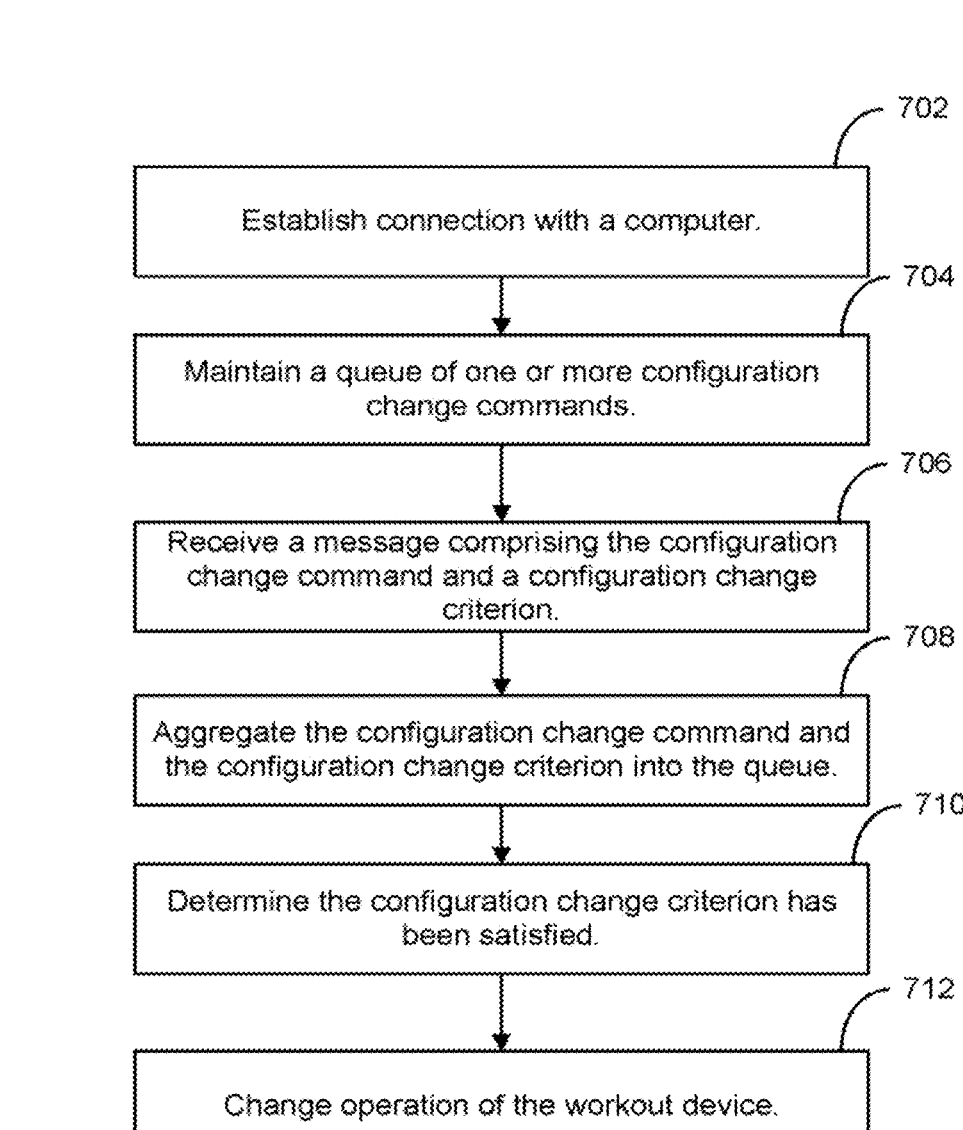

700

702
Establish connection with a computer.

704
Maintain a queue of one or more configuration change commands.

706
Receive a message comprising the configuration change command and a configuration change criterion.

708
Aggregate the configuration change command and the configuration change criterion into the queue.

710
Determine the configuration change criterion has been satisfied.

712
Change operation of the workout device.

FIG. 7

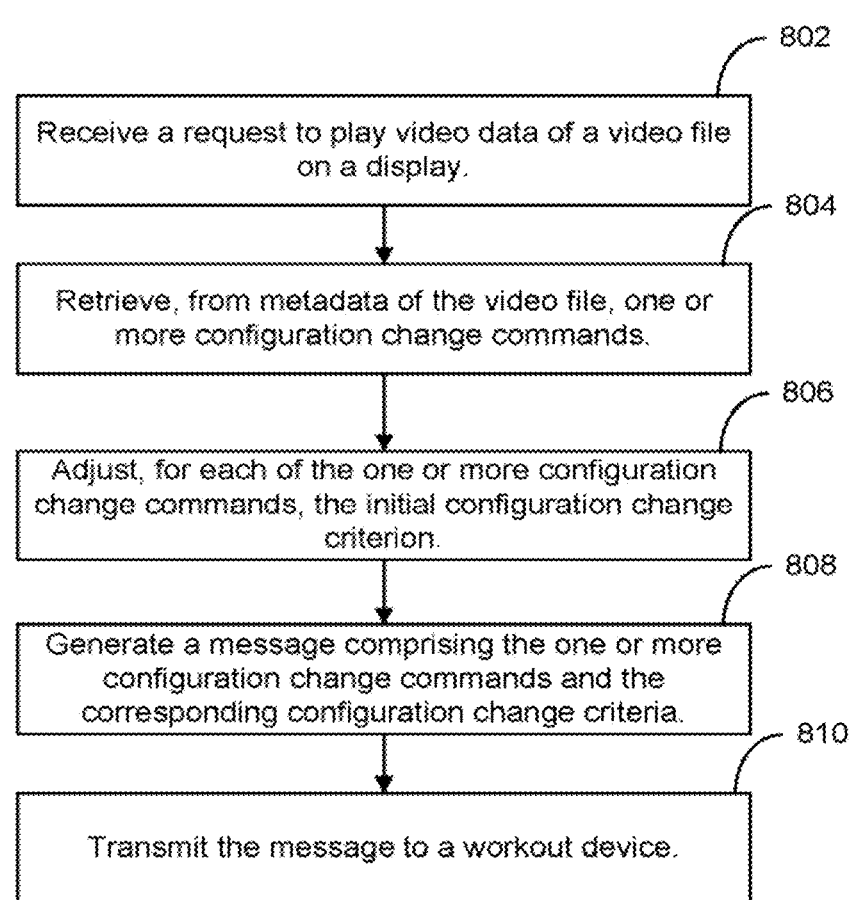
FIG. 8

SYSTEMS AND METHODS FOR SYNCHRONIZING WORKOUT EQUIPMENT WITH VIDEO FILES

CROSS REFERENCES

This application claims the benefit and priority to U.S. patent application Ser. No. 18/091,004, filed Dec. 29, 2022, which claims priority to U.S. Provisional Patent Application No. 63/295,419, filed Dec. 30, 2021, and to U.S. Provisional Patent Application No. 63/306,251, filed Feb. 3, 2022, each of which is incorporated herein by reference in their entireties for all that they disclose.

BACKGROUND

Often, when people work out using mechanical workout equipment or exercise devices, such as a treadmill or a stationary bicycle, they watch a video on a screen that corresponds to the workout. Such videos may include instruction videos from instructors in a studio or more involved videos that show a camera traveling through an environment. The involved videos that show a camera traveling through an environment are often meant to simulate a user physically traveling through the same environment, giving the user the feeling that he or she is in the environment while the user physically remains indoors on the immobile equipment.

To increase the realism of a workout video that shows an environment, a user may change the configuration of the equipment that he or she is using while watching the video. For example, if a user is working out on a treadmill, the user may adjust the incline of the treadmill when a workout video shows an uphill incline. In another example, if a user is working out on a stationary bicycle, the user may adjust the resistance setting of the bicycle when a workout video shows a downhill or uphill incline. Making such changes in real-time can cause the simulation provided by the workout video to lose its realism because the user is required to identify the contents of a video, determine new settings that will correspond to the video, and manually adjust the configuration of the workout equipment. This process may take time and become tiresome, especially when the video includes a more erratic environment, such as rolling hills.

SUMMARY

For the aforementioned reasons, there is a need for a system that can automatically synchronize workout videos with workout equipment such that a user does not need to manually change the workout equipment at each instance the environment presented in the video changes. Conventional systems that have tried to automatically control workout equipment to correspond with a workout video have tried to do so by sending control signals to the workout equipment as the system processes the video. Such methods often result in significant latency, however, because of the time required to process the video to determine the correct control signals to send to the workout equipment. Further, because such control signals are often sent over a wireless network, such as Wi-Fi, the control signals may take time to travel to the workout equipment.

To overcome the technical deficiencies of conventional systems, the systems and methods described herein create a queue of configuration change commands in memory of a workout device that causes the workout device to adjust its configuration when various criteria for the configuration change commands are satisfied. For example, a system implementing the methods described herein may execute a workout video file to display a workout video on a display (e.g., a display of a tablet or of a television). While doing so, the system may extract configuration change commands and corresponding criteria that need to be satisfied for the corresponding configuration change commands to be executed from the workout video file and transmit the configuration change commands and the configuration change criteria to the workout device. A processor executing on the workout device may receive the configuration change commands and configuration change criteria and store them in a queue in memory local to the workout device. The workout device may determine when the configuration change criteria for the various configuration change commands are satisfied as the workout video plays and the person uses the workout device. The workout device may then adjust the configuration of the workout device according to the configuration change commands that correspond to the satisfied configuration change criteria. Because the configuration change commands and configuration change criteria are already stored locally on the workout device and do not require real-time processing by the same processor that executes the workout video, the workout device can adjust its configuration in real-time with the video without any latency that is caused by signal transmission across a network. Thus, the simulation provided by the workout video can remain intact.

In one aspect of the present disclosure, a method for synchronizing workout equipment with a workout video file to reduce latency is disclosed. The method comprises executing, by a processor of a computing device, a workout video file to display a workout video on a display; retrieving, by the processor, a configuration change command and a configuration change criterion from the workout video file; generating, by the processor, a message comprising the configuration change command and the configuration change criterion; and transmitting, by the processor over a communications network, the message to the workout device. The message causes the workout device to aggregate the configuration change command and the configuration change criterion into a queue of one or more configuration change commands that is stored in a memory of the workout device; and change operation according to the configuration change command in response to determining the configuration change criterion is satisfied.

In some embodiments, the method further comprises establishing, by the processor, a connection with an external device; and synchronizing, by the processor, an internal clock of the processor with an external clock stored in the external device. In some embodiments, retrieving the configuration change criterion comprises retrieving, by the processor, a configuration change timestamp from the video file; and determining, by the processor, a global configuration change command timestamp based on a start time of the workout video file, the configuration change timestamp, and the internal clock, wherein transmitting the message to the workout device comprises transmitting, by the processor, the message comprising the configuration change command and the global configuration change command timestamp to the workout device.

In some embodiments, receipt of the configuration change command and the global configuration change command timestamp causes the workout device to change operation according to the configuration change command based on the global configuration change command timestamp. In some embodiments, the workout device receives an input indicating the workout video is paused; determines a pause length in which the workout video remained paused; determines a second global configuration change command timestamp by aggregating the pause length with the global configuration change command timestamp; and replaces the global configuration change command timestamp with the second global configuration change command timestamp in the queue.

In some embodiments, the method further comprises receiving, by the processor, an input to pause the workout video; determining, by the processor, a pause length in which the workout video remained paused; determining, by the processor, a second global configuration change command timestamp by aggregating the pause length with the global configuration change command timestamp; and transmitting, by the processor, a second message comprising the configuration change command and the second global configuration change command timestamp to the workout device, receipt of the second message causing the workout device to replace the global configuration change command timestamp with the second global configuration change command timestamp in the queue. In some embodiments, the method further comprises retrieving the configuration change criterion comprises retrieving, by the processor, a configuration change distance from the video file, and wherein transmitting the message to the workout device comprises transmitting, by the processor, the message comprising the configuration change command and the configuration change distance to the workout device.

In some embodiments, the method further comprises transmitting, by the processor, a reset command to the workout device, receipt of the reset command causing the workout device to remove each configuration change command from the queue. In some embodiments, the method further comprises determining, by the processor, the workout device has changed operation for each configuration change command of the workout video file, wherein transmitting the reset command to the workout device is performed in response to the determination.

In some embodiments, the method further comprises transmitting, by the processor, a second configuration change command and a second configuration change criterion to the workout device; and receiving, by the processor, a message from the workout device indicating the workout device does not have enough memory to add the second configuration change command and the second configuration change criterion to the queue. In some embodiments, the method further comprises determining, by the processor, a predetermined amount of time has passed since the processor received the message indicating the workout device does not have enough memory; and in response to the determination, retransmitting, by the processor, the second configuration change command and the second configuration change criterion to the workout device.

In some embodiments, receipt of the retransmitted second configuration change command the second configuration change criterion causes the workout device to add the second configuration change command and the second configuration change criterion to the queue in response to determining there is enough memory in the queue for the second configuration change command and the second configuration change criterion. In some embodiments, the method further comprises transmitting, by the processor, a second message comprising a second configuration change command without a configuration change criterion to the workout device, wherein the second message causes the workout device to change operation according to the second configuration change command immediately instead of adding the second configuration change command to the queue in response to the second message not including a configuration change criterion.

In some embodiments, transmitting the message to the workout device is performed in response to determining, by the processor, the workout device is in a ready and waiting state. In some embodiments, transmitting the message to the workout device comprises transmitting, by the processor, the message to the workout device via an intermediary server. In some embodiments, transmitting the message to the workout device is performed in response to determining the workout device is in a ready and waiting state, and wherein the processor determines the workout device is in the ready and waiting state by retrieving a current state of the workout device from the intermediary server. In some embodiments, establishing the connection with the workout device over the communications network comprises establishing, by the processor, the connection with the workout device via a Wi-Fi interface.

In another aspect of the present disclosure, a system for synchronizing workout equipment with a workout video file to reduce latency is disclosed. The system comprises a computing device comprising a processor. The processor executes the workout video file to display a workout video on a display; retrieves a configuration change command and a configuration change criterion from the workout video file; generates a message comprising the configuration change command and the configuration change criterion; and transmits, over a communications network, the message to the workout device. The message causes the workout device to aggregate the configuration change command and the configuration change criterion into a queue of one or more configuration change commands that is stored in memory of the workout device; and changes operation according to the configuration change command in response to determining the configuration change criterion is satisfied.

In some embodiments, the processor further establishes a connection with an external device; and synchronizes an internal clock of the processor with an external clock stored in the external device. In some embodiments, the processor retrieves the configuration change criterion by retrieving a configuration change timestamp from the video file; and determining a global configuration change command timestamp based on a start time of the workout video file, the configuration change timestamp, and the internal clock. Transmitting the message to the workout device may comprise transmitting, by the processor, a message comprising the configuration change command and the global configuration change command timestamp to the workout device.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 is an illustration of an example workout video file, in accordance with some embodiments.

FIG. 6 is another example method for workout synchronization, in accordance with some embodiments.

FIG. 7 is another example method for workout synchronization, in accordance with some embodiments.

FIG. 8 is another example method for workout synchronization, in accordance with some embodiments.

Figure 1A:
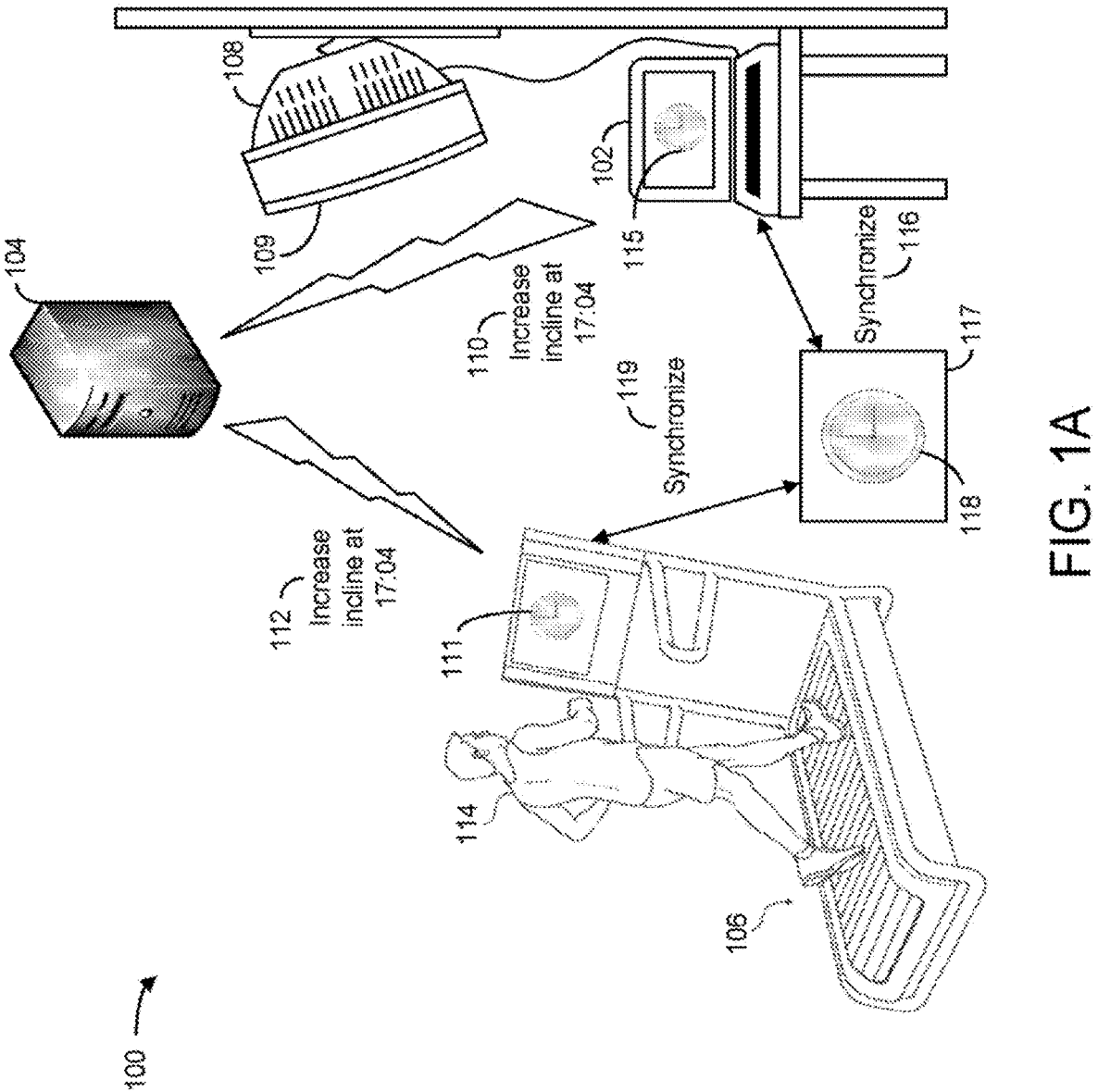
FIG. 1A is an illustration of an example workout synchronization environment, in accordance with some embodiments.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, in the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

FIG. 1A is an illustration of an example workout synchronization environment 100, in accordance with some embodiments. The workout synchronization environment 100 may include a computing device 102, an intermediary device 104, a workout device 106, and a display device 108. The display device 108 may include a display 109 and may be or include a computer, a monitor, a television, or any other device that includes a display. The display 109 may be a CRT (cathode ray tube), LCD (liquid crystal display), OLED (organic light emitting diode), TFT (thin-film transistor), plasma, other flexible configuration, or any other monitor for displaying information to an individual. In some embodiments, the display device 108 is the same as or includes the computing device 102 (e.g., the display device 108 is a tablet or smart television and the computing device 102 is or contains a processor for the display device 108). The computing device 102 may communicate with the intermediary device 104, the workout device 106, and/or the display device 108 via a wired communication interface (e.g., LAN) or a wireless communication interface (e.g., a Wi-Fi or Bluetooth communication interface). The computing device 102 may execute a video file for a workout to display or render the video from the video file on the display device 108. In some embodiments, by executing the video file, the computing device transmits, via a communications protocol such as Wi-Fi, a configuration change command and configuration change criterion from the video file in a message 110 to the intermediary device 104. The configuration change command and configuration change criterion may include a command to adjust how the workout device 106 is operating according to the video being displayed on the display device 108 (e.g., increase the incline on the workout device 106 when the video is showing an uphill incline or when a trainer on the video gives a command to increase the incline). The configuration change command and configuration change criterion may also include a configuration change criterion indicating when to execute the configuration change command (e.g., execute the configuration change command when an internal clock 111 of the workout device 106 indicates the time is 17:04). The intermediary device 104 may receive the message 110 and send, via a communications protocol such as Wi-Fi, a message 112 including the configuration change command and configuration change criterion to the workout device 106.

The workout device 106 may receive the message 112 and add the configuration change command and configuration change criterion from the message 112 into a queue in memory. The queue may be or include one or more configuration change commands and/or configuration change criteria in memory (e.g., the queue may be a buffer in memory). When a configuration change criterion for a configuration change command is satisfied, the workout device 106 executes the configuration change command and may remove the configuration change criterion and configuration change command from the queue and/or from memory. The workout device 106 may continuously evaluate the configuration change criterion until the workout device 106 determines the configuration change criterion is satisfied (e.g., determines the internal clock 111 of the workout device 106 indicates the time is 17:04). The workout device 106 may then execute the configuration change command to change the configuration of the workout device 106 (e.g., increase the incline of the workout device) in response to determining the configuration change criterion is satisfied. In this way, the computing device 102 may control the configuration of the workout device 106 such that the configuration of the workout device 106 matches the video that the display device 108 is displaying. Thus, a user 114 working out on the workout device 106 may feel more immersed in the video because any latency that is often involved in transmitting signals over a communications network may be minimized or removed.

In some embodiments, to ensure the video that the computing device 102 is presenting on the display device 108 matches the configuration of the workout device 106, the computing device 102 and the workout device 106 may synchronize their internal clocks (e.g., the internal clock 111 of the workout device 106 and an internal clock 115 of the computing device 102) with the same external clock (e.g., an external clock 118 maintained on a remote device 117). As described herein, synchronize means the computing device 102 and the workout device 106 exactly match the time of the external clock 118 or match the time of the external clock 118 within a tolerance, such as a half second or one second tolerance. For example, the computing device 102 may send a synchronization message 116 to the remote device 117 (e.g., a remote server) hosting the external clock 118. The computing device 102 may receive a message from the remote device 117 with the current time of the external clock 118 and the computing device 102 may then match the internal clock 115 of the computing device 102 to the current time. The workout device 106 may similarly send a synchronization message 119 to the remote device 117 to synchronize the internal clock 111 stored on the workout device with the external clock 118. The computing device 102 may then send configuration change criteria with configuration change commands with real-world times (e.g., the current time instead of a time of the video that the computing device 102 is playing) to the workout device 106 such that the workout device 106 adjusts its configuration based on the real-world times. Accordingly, because the computing device 102 and the workout device 106 are synchronized via the same external clock 118, the workout device 106 may adjust its configuration to match the time of the computing device 102 and the workout video without any latency that is typically involved in transmitting signals over a network in real-time.

Figure 1B:
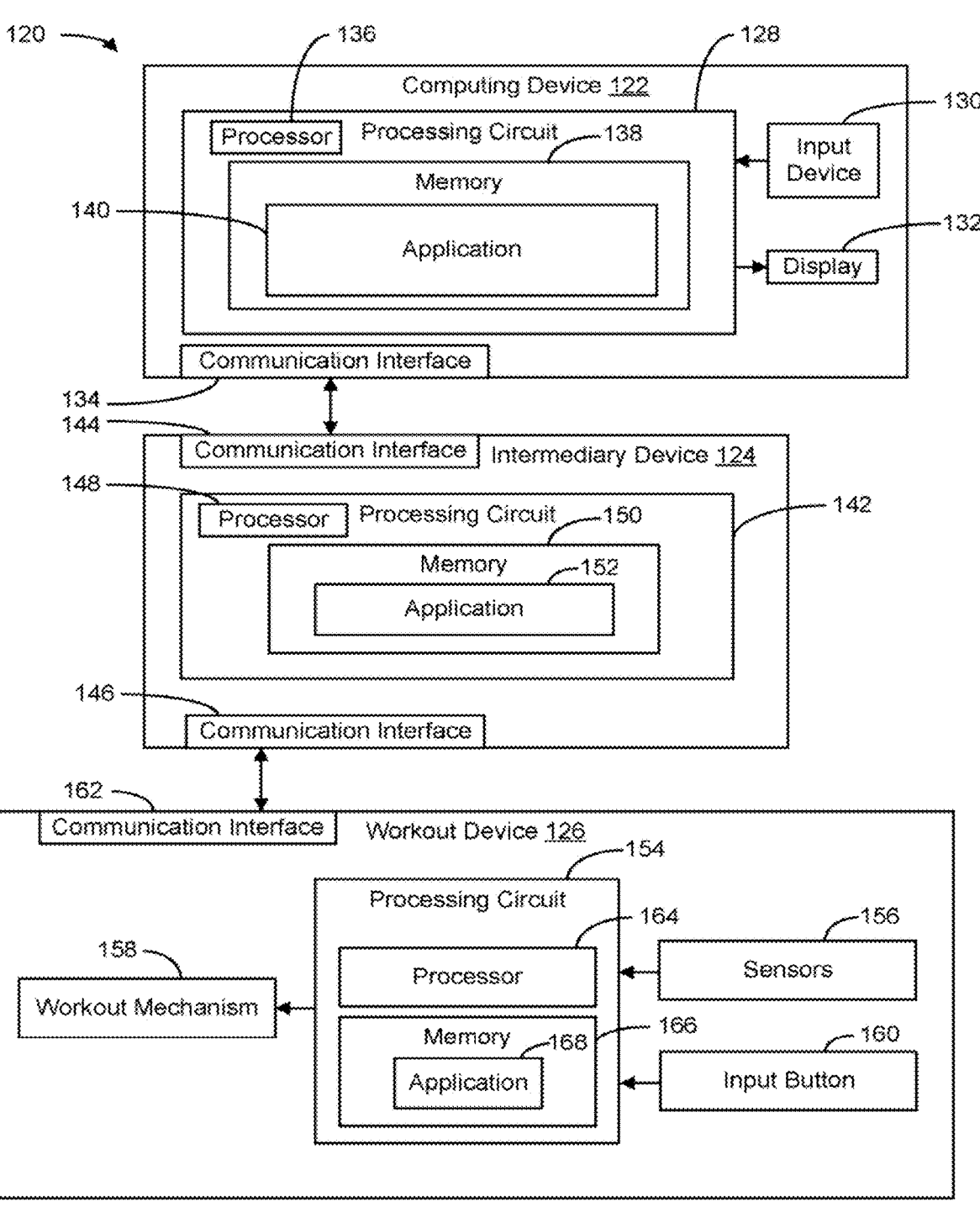
FIG. 1B is an illustration of an example workout synchronization system, in accordance with some embodiments.

FIG. 1B is an illustration of an example workout synchronization system 120, in accordance with some embodiments. The workout synchronization system 120 may include a computing device 122, an intermediary device 124, and a workout device 126. The computing device 122, the intermediary device 124, and the workout device 126 may be the same as or similar to the computing device 102, the intermediary device 104, and the workout device 106, shown and described with reference to FIG. 1A. The computing device 122 may be any computing device that is capable of executing video files and communicating over a communications network. The intermediary device 124 may be a computer or server that stores a current state of the workout device 126, such as a server that manages internet-of-things devices. The workout device 126 may be any type of workout device such as, but not limited to, a treadmill, a weight machine, a rowing machine, a stationary bicycle, a stair climber, or an elliptical machine. In some embodiments, the workout device 126 is a smart bed that can move in response to control signals from a controller. As described herein, a computing device or a computer is or includes any type and form of media device or computing device, including a desktop computer, laptop computer, portable computer, tablet computer, wearable computer, embedded computer, smart television, set top box, console, Internet of Things (IoT) device or smart appliance, or any other type and form of computing device.

The computing device 122 may include a processing circuit 128, an input device 130, a display 132, and a communication interface 134. The processing circuit 128 may include a processor 136 and a memory 138. The memory may include an application 140. The intermediary device 124 may include a processing circuit 142, a communication interface 144, and a communication interface 146. In some embodiments, the communication interfaces 144 and 146 are the same communication interface. The processing circuit 142 may include a processor 148 and a memory 150. The memory 150 may include an application 152. The workout device 126 may include a processing circuit 154, sensors 156, a workout mechanism 158, an input button 160, and a communication interface 162. In instances in which the workout device 126 is a treadmill, the sensors 156 may be or include a resistance sensor and/or a motion sensor that measures the motion of a belt on the treadmill. The sensors 156 may measure how many times, and to what degree, the belt has traveled around the treadmill (e.g., the distance a user has run on the treadmill). The sensors may send the measured data to the processing circuit 128. The sensors may include any type of sensor that measures how a user has used the workout device 126. The processing circuit 154 may include a processor 164 and a memory 166. The memory 166 may include an application 168.

FIG. 2 is an illustration of an example workout video file 200, in accordance with some embodiments. The workout video file 200 may include video data 202, a list of configuration change commands 204, and a list of configuration change criteria 206. The video data 202 may be or include any type of video file (e.g., MP4, MOV, WMV, FLV, AVI, WebM, MKV, etc.) or video data (e.g., an audiovisual data stream) of a workout video. As described herein, the video data may be a point of view video of a camera traveling along a real-world terrain or a studio workout with an instructor providing workout instructions. A computer may execute or process (e.g., read) the video data 202 to render the video on a screen so a user can view the video as he or she works out.

In addition to the video data 202, the workout video file 200 may include the list of configuration change commands 204 as metadata of the workout video file 200. The list of configuration change commands 204 may be or include computer-readable strings that, when read by a processor controlling a workout device, cause the processor to adjust how the workout device is operating. For example, the list of configuration change commands 204 may include commands that adjust the speed and/or incline of a treadmill. The configuration change commands of the list of configuration change commands 204 may be retrieved and transmitted to a workout device when a processor executes, processes, or renders the video data of the workout video file 200 to cause the workout device to operate according to what is being displayed in the workout video or to instructions that an instructor instructed in the video provides.

In some embodiments, the list of configuration change commands 204 is paired with the list of configuration change criteria 206 as metadata of the workout video file 200. For example, each configuration change command may be stored in the workout video file 200 as a configuration change pair with a configuration change criterion. The list of configuration change criteria 206 may include various configuration change criteria that need to be satisfied for the corresponding configuration change commands 204 to be implemented at the workout device. Examples of configuration change criteria include configuration change timestamps that indicate how far into the workout video to execute a corresponding configuration change command and a configuration change distance (e.g., a distance traveled or simulated to be traveled (such as a distance traveled on a treadmill or stationary bicycle) using a respective piece of workout equipment). For example, as illustrated, a configuration change criterion may be satisfied 30 seconds into the video. The computing device that is rendering the workout video on a display may determine a global configuration change timestamp for the configuration change criterion by identifying the real-world time that the video began playing (e.g., a start time) or the real-world time that the computing device received a request to begin playing and adding the 30 second configuration change timestamp to the real-world time to determine the global configuration change timestamp. Accordingly, at the real-world time that is identified in the global configuration change timestamp, a workout device (e.g., a treadmill) may change its configuration according to a configuration change command that corresponds to the global configuration change timestamp. In another example, a configuration change criterion may be satisfied after a person runs 7 miles on a treadmill and correspond to a 5-mph set speed. A processor on a treadmill may determine that a user ran 7 miles on the treadmill based on sensor data on the treadmill and adjust the speed of the treadmill to 5 mph accordingly. The computer executing or processing the video data 202 from the workout video file 200 may concurrently extract the configuration change commands from the workout video file 200 so the workout device may automatically adjust its configuration to match the video as the video is playing.

In some instances, synchronization issues may arise when a user pauses a workout. For example, a computing device may transmit global configuration change timestamps and configuration change commands to a workout device as the computing device presents a workout video on a display. A user using the workout device may pause a workout using an input button on the workout device and/or by pausing a workout video on the computing device. When this occurs, either the computing device or the workout device may recalculate or determine a new global configuration change timestamp (e.g., a second global configuration change timestamp) for each global configuration change timestamp that the workout device had stored for the workout video. To do so, the workout device or the computing device may identify the length of the pause (e.g., a pause length) in the video. The workout device or the computing device may then add the length of the pause to each of the global configuration change timestamps to determine a new global configuration change timestamp for each global configuration change timestamp that was in the queue. In embodiments in which the computing device determines new global configuration change timestamps, the computing device may transmit new messages to the workout device that contain the new global configuration change timestamps and the configuration change commands that correspond to the global configuration change timestamps.

Figure 3:
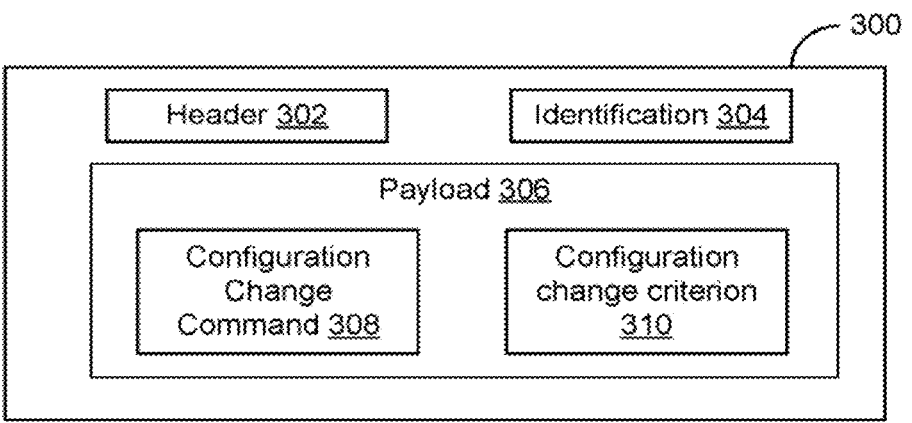
FIG. 3 is an illustration of an example message for configuring a workout device, in accordance with some embodiments.

FIG. 3 is an illustration of an example message 300 for configuring a workout device, in accordance with some embodiments. The message 300 may include a header 302, an identification 304, and a payload 306. The header 302 may direct the message 300 to an intermediary server configured to control a workout device. The identification 304 may be an identification of the workout device that the intermediary server may use to forward the message to the workout device. In some embodiments, the identification 304 is a part of or concatenated to the header 302. The payload 306 may include a configuration change command 308 and a configuration change criterion 310 of a workout video file that the computing device is executing to present a workout video to a user. The computing device may generate the message 300 when the computing device executes the workout video file and retrieves the configuration change command 308 and the configuration change criterion 310 from the workout video file. In some embodiments, the computing device generates the message 300 using an MQTT protocol and only includes the one configuration change command 308 and the one corresponding configuration change criterion 310 that corresponds to the configuration change command 308. In some embodiments, the computing device retrieves any number of such configuration change commands and/or configuration change criteria from the workout file to include in the message.

Figure 4:
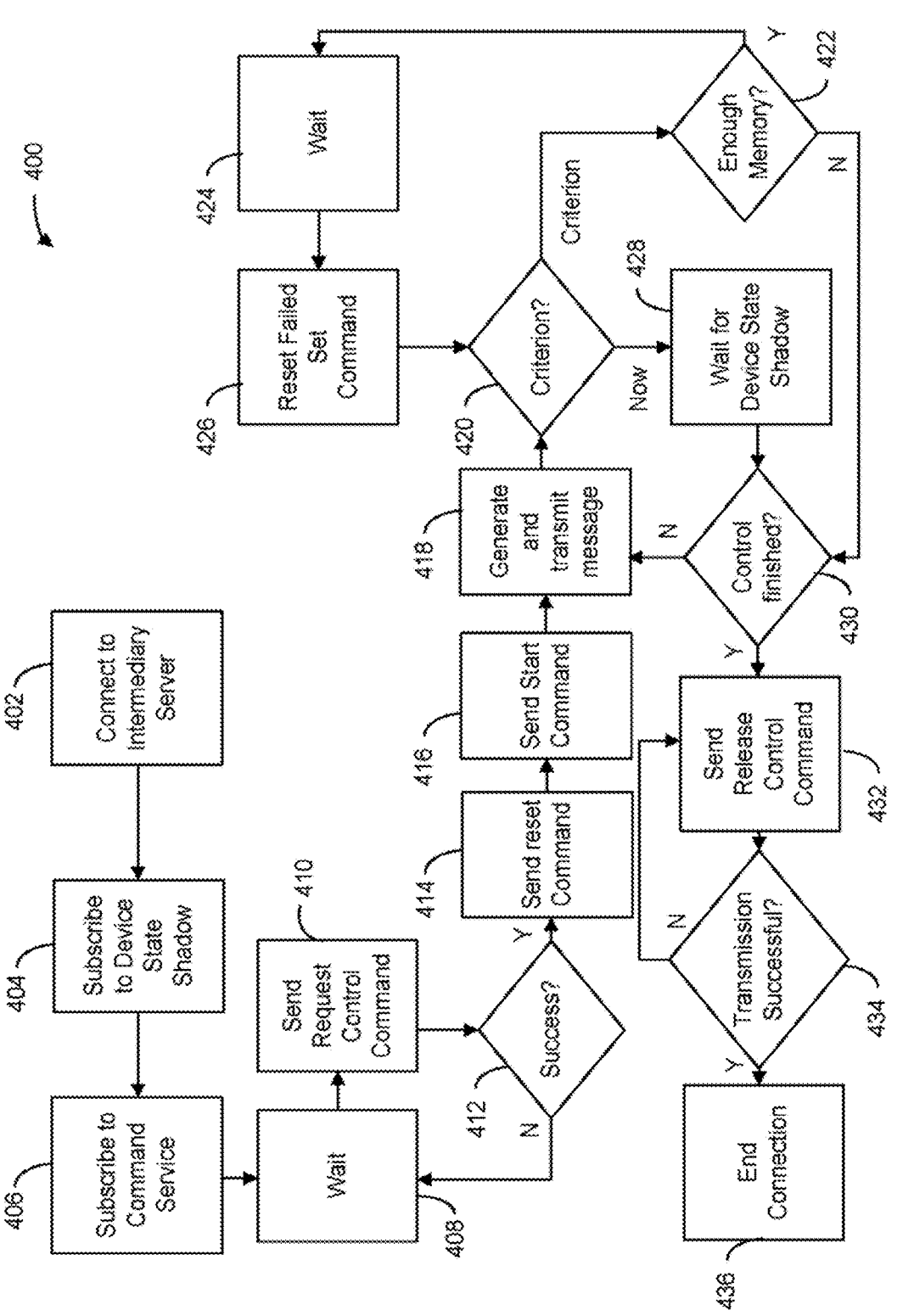
FIG. 4 is an example method for workout synchronization, in accordance with some embodiments.

FIG. 4 is an example method 400 for workout synchronization, in accordance with some embodiments. A data processing system (e.g., the processor 136 of the computing device 122) may perform one or more of the operations of the method 400. The method 400 may include more or fewer operations and the operations may be performed in any order. At operation 402, the data processing system may connect to an intermediary server. At operation 404, the data processing system may subscribe to a device state shadow. At operation 406, the data processing system may subscribe to a command service. At operation 408, the data processing system may wait for the workout device to be in a ready and waiting state. At operation 410, the data processing system may send a request control command to the workout device. At operation 412, the data processing system may determine whether the request control command was successfully sent. At operation 414, the data processing system may send a reset command. At operation 416, the data processing system may send a start command. At operation 418, the data processing system may generate and transmit a message comprising one or more configuration change commands and/or configuration change criteria. At operation 420, the data processing system may determine if a configuration change command is to be performed immediately or upon a criterion or condition being satisfied. In response to determining the configuration change command is conditional, at operation 422, the data processing system may determine whether a response indicates there is not enough memory to store the configuration change command. In response to determining the response indicates there is not enough memory, at operation 424, the data processing system may wait a predetermined amount of time. At operation 426, the data processing system may reset the failed set command.

In response to determining a configuration change command is to be performed immediately, at operation 428, the data processing system may wait for a device state shadow to update. At operation 430, the data processing system may determine whether control is finished. In response to determining control is not finished, the method may return to operation 418. However, in response to determining control is finished, at operation 432, the data processing system may send a release control command to the workout device. At operation 434, the data processing system may determine whether the release control command transmission was successful. In response to determining the release control command transmission was unsuccessful, the data processing system may retransmit the release control command. Otherwise, at operation 436, the data processing system may end the connection with the workout device.

Figure 5:
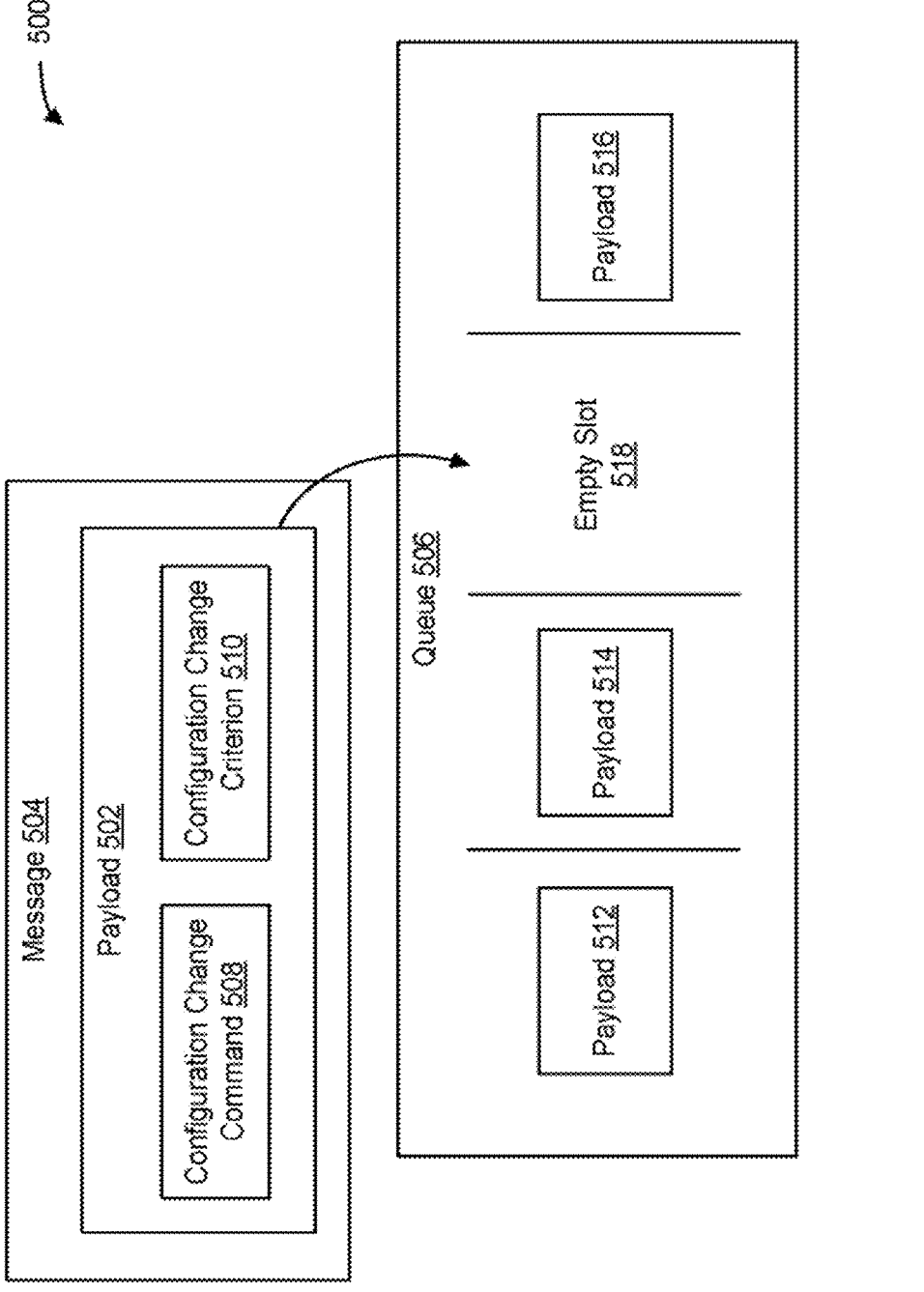
FIG. 5 is an illustration of an example sequence diagram of a sequence for adding data from a workout video file to a queue for workout synchronization, in accordance with some embodiments.

FIG. 5 is an illustration of an example sequence diagram of a sequence 500 for adding data from a workout video file to a queue for workout synchronization, in accordance with some embodiments. The sequence 500 includes a workout device (not shown) adding a payload 502 from a message 504 to a queue 506 in memory of the workout device. The payload may include a configuration change command 508 and a configuration change criterion 510. The queue may include payloads 512, 514, and 516 and an empty slot 518. The workout device may extract the configuration change command 508 and the configuration change criterion 510 from the message 504 and add the extracted configuration change command 508 and the configuration change criterion 510 to the empty slot 518.

FIG. 6 is another example method 600 for workout synchronization, in accordance with some embodiments. A data processing system (e.g., the processor 136 of the computing device 122, shown and described with reference to FIG. 1) and/or a workout device (e.g., the workout device 106, shown and described with reference to FIG. 1) may perform one or more of the operations of the method 600. The method 600 may include more or fewer operations and the operations may be performed in any order. At operation 602 the data processing system may establish a connection with a workout device over a communications network. At operation 604, the data processing system may execute a workout video file to display a workout video on a display. At operation 606, the data processing system may retrieve a configuration change command and a configuration change criterion from the workout video file. At operation 608, the data processing system may generate a message comprising the configuration change command and the configuration change criterion. At operation 610, the data processing system may transmit, over the communications network, the message to the workout device. The message may cause the workout device to aggregate the configuration change command and the configuration change criterion into a queue of one or more configuration change commands that is stored in a memory of the workout device. The workout device may change operation according to the configuration change command in response to determining the configuration change criterion is satisfied.

FIG. 7 is another example method 700 for workout synchronization, in accordance with some embodiments. A data processing system (e.g., the processor 164 of the workout device 106, shown and described with reference to FIG. 1) may perform one or more of the operations of the method 700. The method 700 may include more or fewer operations and the operations may be performed in any order. At operation 702, the data processing system may establish a connection with a computer over a communications network. At operation 704, the data processing system may maintain a queue of one or more configuration change commands and corresponding one or more configuration change criteria in memory. At operation 706, the data processing system may receive a message comprising a configuration change command and a configuration change criterion. At operation 708, the data processing system may aggregate the configuration change command and the configuration change criterion into the queue. At operation 710, the data processing system may determine the configuration change criterion has been satisfied. At operation 712, the data processing system may change operation of the workout device according to the configuration change command in response to determining that the configuration change criterion is satisfied.

FIG. 8 is another example method 800 for workout synchronization, in accordance with some embodiments. A data processing system (e.g., the processor 136 of the computing device 122, shown and described with reference to FIG. 1) and/or a workout device (e.g., the workout device 106, shown and described with reference to FIG. 1) may perform one or more of the operations of the method 800. The method 800 may include more or fewer operations and the operations may be performed in any order. At operation 802 the data processing system may receive a request to play video data of a video file on a display. At operation 804, the data processing system may retrieve, from metadata of the video file, one or more configuration change commands, each configuration change command associated with a corresponding initial configuration change criterion. At operation 806, the data processing system may adjust, for each of the one or more configuration change commands, the initial configuration change criterion based on a time of receipt of the request. At operation 808, the data processing system may generate a message comprising the one or more configuration change commands and the corresponding adjusted configuration change criteria. At operation 810, the data processing system may transmit, over a communications network, the message to a workout device. Receipt of the message may cause the workout device to execute each of the one or more configuration change commands in response to detecting the corresponding adjusted condition is satisfied.

INDUSTRIAL APPLICABILITY

As previously mentioned, it can be difficult to provide a realistic simulation of an outdoor workout for stationary workout equipment without requiring a user to manually change how the equipment is configured or without introducing significant latency when making such configuration changes. These problems are particularly prominent in "headless" workout equipment that does not have a built-in display when a user instead relies on an external computer and/or display (e.g., an external smart television) in conjunction with the workout equipment to create a realistic workout environment simulation. Conventional systems that have tried to automatically control a piece of workout equipment from an external computer (e.g., a computer that is separate from any computer on the workout equipment) to match how the workout equipment is operating with a workout video have tried to do so by sending control signals to the workout equipment in real-time as the system processes the video. One example of using headless workout equipment is a user watching a workout video on a tablet that the user places on the workout equipment and that wirelessly controls the workout equipment to match what the tablet is displaying in the workout video. Such methods often result in significant latency because of the time that is required to process the video to determine the correct control signals to send to the workout equipment. Further, studies have shown that control signals originating at the external computer attempting to synchronize the equipment with the video can have a round-trip time of up to 2.5 seconds when being transmitted over a network. This latency can ruin the simulation because by the time the control signal arrives at the workout equipment and the workout equipment changes its configuration to match the video, the video may be presenting a completely different environment (e.g., the video may be showing an uphill incline by the time the workout equipment adjusts to correspond to a downhill incline that the video was previously showing). This latency can be a problem even when the external computer is in the same room as the workout equipment because the signal may need to travel to a server in the cloud and then back to the workout equipment before the signal finally reaches the workout equipment.

To overcome the technical deficiencies of conventional systems, a system implementing the methods described herein may create a queue of configuration change commands on a workout device that causes the workout device to adjust its configuration when various configuration change criteria for the configuration change commands are satisfied. By doing so, the system may reduce the aforementioned control latency. For example, the system may execute a workout video file to display a workout video on a display. The system may extract configuration change commands (e.g., commands to change the configuration of workout equipment such as the belt speed or incline of a treadmill or a resistance on a stationary bicycle) and corresponding configuration change criteria (e.g., global configuration change command timestamps and/or configuration change distances) that need to be satisfied from the workout video file. The system may transmit the configuration change commands and the configuration change criteria to the workout device. A processor executing on the workout device may receive the configuration change commands and configuration change criteria and store them in a queue in memory local to the workout device. The workout device may determine configuration change criteria for the various commands are satisfied as the workout video plays and the person uses the workout device. The workout device may do so by comparing a clock stored in memory of the workout device to global configuration change command timestamps in the queue and/or distance traveled data to configuration change distances in the queue. The workout device may adjust the configuration of the workout device according to the configuration change commands that correspond to the configuration change criteria that are satisfied based on the internal clock of workout device matching a global configuration change command timestamp in a queue and/or the distance traveled using the workout device matching a configuration change distance in the queue. The configuration change commands and configuration change criteria are already stored locally on the workout device and do not require real-time processing by the processor that executes the workout video. Accordingly, the workout device can adjust its own configuration in real-time with the video without any latency that would otherwise result from signal transmission across a network. Thus, the real-time simulation provided by the workout video can remain intact.

One problem that can arise when implementing the queue-based method that is described above is that it can be difficult to match the various configuration change commands that change the operation of the workout device with the workout video. This is particularly a problem because the processor that is processing the video (e.g., a processor on a computer that is in communication with the workout device and a display) is physically and logically separate from the processor that is controlling the workout device (e.g., a processor that is located within and controls the configuration of the workout device). Consequently, the processor on the workout device may not know how far into the video the workout video is at various points in time, particularly if a user pauses the workout video.

To ensure there is a match between the configuration of the workout device and the workout video, the external computer and the workout equipment may synchronize their internal clocks with the same external clock (e.g., synchronize an internal clock with an external time source such as a server providing time using the NTP protocol) that is stored and maintained on an external device or server. The computer executing the workout video may identify a timestamp within the video that corresponds to a particular configuration change command from the video's workout video file and determine when that time would happen on the synchronized clock. The computer may identify the time on the synchronized clock that the video began or will start and add the timestamp to the begin time (e.g., the time the video began playing) to determine a global configuration change command timestamp indicating a time on the workout device's synchronized clock to perform the configuration change command. The computer may transmit the global configuration change command timestamp to the workout machine with the configuration change command. Because the workout machine is synchronized to the same clock as the computer that is presenting the workout video, the workout machine may execute the configuration change command to change configurations based on the global configuration change command timestamp to match the workout video. This process helps ensure the video and the workout video are properly synchronized without using real-time commands from the data processing system. In other words, this process enables an external processor that is not directly controlling (e.g., not sending signals to) the mechanical mechanisms of a workout device to present a workout video where the content of the workout video matches the current configuration of the workout device (e.g., if a video is showing an uphill incline and the workout device is a treadmill, the workout device would be at an incline as well and the workout device changes configuration as the workout video plays without any latency that is inherent to wireless communication causing the configuration causing a mismatch between the configuration of the workout device and the workout video).

An example workout synchronization system is described herein. In brief overview, the workout synchronization system may include a computing device, an intermediary device, and a workout device. The computing device, the intermediary device, and the workout device may communicate with each other over a network. In some embodiments, the computing device can communicate with the workout device through the intermediary device (e.g., using an MQTT protocol, the computing device can transmit a message to the intermediary device and the intermediary device may route the message to the workout device). The computing device, the intermediary device, and the workout device may operate together to simulate a real-world workout (e.g., a workout on the road or a workout in nature) on a stationary piece of workout equipment. The system may include more or fewer components. For example, there may be any number of computing devices or computers that make up or are a part of the system.

The computing device may include a processing circuit, an input device, a display, and a communication interface. The processing circuit may include a processor and a memory. The memory may include an application. The computing device may communicate with the workout device using the intermediary device as a communication bridge to transmit signals. To do so, the computing device may communicate with the intermediary device via the communication interface and the intermediary device may forward the communication to the workout device. The processor may be or include an ASIC, one or more FPGAs, a DSP, circuits containing one or more processing components, circuitry for supporting a microprocessor, a group of processing components, or other suitable electronic processing components. In some embodiments, the processor may execute computer code or modules (e.g., executable code, object code, source code, script code, machine code, etc.) stored in memory to facilitate the activities described herein. The memory may be any volatile or non-volatile computer-readable storage medium capable of storing data or computer code.

The memory may include an application. The processor may execute the application to execute workout video files stored in a database within memory (not shown). Executing the application may cause the application to retrieve workout video files from the database and execute the workout video files to present the videos of the files on the display. Additionally, the application may retrieve workout device configuration change commands and corresponding configuration change criteria from the workout video files. The application may generate message(s) that include the configuration change commands and configuration change criteria and transmit the message(s) to the workout device via the intermediary device.

The intermediary device may include a processing circuit, a communication interface, and another communication interface. In some embodiments, the communication interfaces are the same communication interface. The components of the intermediary device may be similar to the components of the intermediary device. The processing circuit may include a processor and a memory. The memory may include an application. The intermediary device may be a server (e.g., a cloud server) that serves as a bridge communication device between the computing device and the workout device. For example, the intermediary device may operate as a bridge that enables the computing device to communicate with the workout device over Wi-Fi. The intermediary device may be a cloud server that is dedicated to Internet of Things communication that enables a computer to control another device.

The workout device may include a processing circuit, sensors, a workout mechanism, a communication interface, and an input button. The processing circuit may include a processor and a memory. The processing circuit and the communication interface may be similar to the processing circuits and the communication interfaces of the computing device and the intermediary device. The memory may include an application. The processor may execute the application to receive the message containing the configuration change command and the configuration change criteria from the computing device (via the intermediary device). The application may retrieve the configuration change command and the configuration change criterion from the message and aggregate the configuration change command and the configuration change criterion into a queue that is stored in the memory of the workout device. The application may evaluate the configuration change criteria of the queue as the computing device displays a workout video and control the workout mechanism based on the configuration change commands in the queue when the corresponding configuration change criteria are satisfied.

The workout device may be any type of workout device. For example, the workout device may be a treadmill, a stationary bicycle, an elliptical, a rowing machine, a stair stepper machine, a weight machine, etc. The workout device may have sensors that monitor a user's performance as the user uses the workout machine. For example, the sensors may monitor how fast a user is running, how far a user has gone, a level of force a user is using, etc. The sensors may detect or generate such data and transmit the data back to the processing circuit for further processing. The workout device may additionally include a control mechanism. The control mechanism may be a physical component that controls various aspects of the workout device. For example, the control mechanism may be a mechanism that controls the incline or a speed of a treadmill or a mechanism that controls the amount of resistance of a stationary bicycle (e.g., a spring, a lever, an actuator, a roller, a damper, etc.). The control mechanism may be or include any controllable aspect of the workout device. The processing circuit may control the workout mechanism based on the configuration change commands that are stored in the queue that is stored in the memory by transmitting control signals to the workout mechanism that correspond to the configuration change commands.

An example workout video file is described herein. The workout video file may include video data. The video data may be any type of video file (e.g., MP4, MOV, WMV, FLV, AVI, WebM, MKV, etc.) or video data (e.g., an audiovisual data stream) of a workout video. As described herein, the workout video may be a point of view video of a camera traveling along a real-world terrain or a studio workout with an instructor providing workout instructions. The workout video files may also be described as command files. A computer may execute or process the video data to display or render the video on a screen so a user can view the video as he or she works out.

In addition to the video file, the workout video file may include a list of configuration change commands. The list of configuration change commands may be or include computer-readable strings that, when read by a processor controlling a workout device, cause the processor to adjust how the workout device is operating. For example, the list of configuration change commands may include commands that adjust the speed and/or incline of a treadmill. As an example, such configuration change commands may include "increase speed by 2 mph," "set speed to 5 mph," "increase incline to 4%," "set incline to 3%," etc. The configuration change commands of the list of configuration change commands may be retrieved and transmitted to a workout device when a processor executes, processes, or renders the video data of the workout video file to cause the workout device to operate according to what is being displayed in the workout video or to instructions that an instructor instructed in the video provides.

In some embodiments, the list of configuration change commands is paired with a list of configuration change criteria. For example, each configuration change command may be stored in the workout video file as a configuration change pair with a configuration change criterion. The list of configuration change criteria may include various configuration change criteria that need to be satisfied for the corresponding configuration change commands to be implemented at the workout device. For example, as illustrated, a configuration change criterion may be satisfied 30 seconds into the video and correspond to a 10% incline configuration change command. Accordingly, after 30 seconds, a workout device (e.g., a treadmill) may increase its incline to 10%. In another example, a configuration change criterion may be satisfied after a person runs 7 miles on a treadmill and correspond to a 5-mph set speed. A processor on a treadmill may determine that a user ran 7 miles on the treadmill based on sensor data on the treadmill and adjust the speed of the treadmill to 5 mph accordingly. The computer executing or processes the video data from the workout video file may concurrently extract the configuration change commands from the workout video file so the workout device may automatically adjust its configuration to match the video as the video is playing.

As described herein, a computing device that executes the workout video file may retrieve the configuration change pairs from the file and transmit the pairs to a workout device. A processor on the workout device may receive the configuration change pairs and store them in a queue. The queue be a buffer in memory of the workout device or be a set of configuration change pairs in such a buffer. The processor may evaluate the configuration change criteria of the pairs as a user uses the workout device while watching the workout video of the workout video file. When the processor on the workout device determines a configuration change criterion of a configuration change pair is satisfied, the processor can identify the configuration change command that corresponds to the satisfied configuration change criteria and adjust the configuration of the workout device based on the configuration change command.

A message that a computing device may send to a workout device is described herein. The message may include a header that directs the message to an intermediary server configured to control the workout device. The message may include an identification of the workout device that the intermediary device may use to forward the message to the workout device. The message may also include a payload including a configuration change command and a configuration change criterion of a workout video file that the computing device is executing to present a workout video to a user. The computing device may generate such a message when the computing device executes the workout video file and retrieves the configuration change command and the configuration change criterion from the workout video file. In some embodiments, the computing device generates the message using an MQTT protocol and only includes one configuration change command and one corresponding configuration change criterion that corresponds to the configuration change command. In some embodiments, the computing device retrieves any number of such configuration change commands and/or configuration change criteria from the workout file to include in the message. In this way, the computing device may generate and transmit a message to a workout device that includes commands to synchronize control between the workout device and the video of the workout video file.

A data processing system (e.g., a processor of a computer) may perform one or more operations to perform the workout synchronization with reduced latency that is described herein. For example, the data processing system may establish a connection with a workout device over a communications network (e.g., a Wi-Fi network). The data processing system may execute a workout video file to display a workout video that is stored in the workout video file on a display. The data processing system may retrieve a configuration change command and a configuration change criterion from the workout video file and generate a message comprising the configuration change command and the configuration change criterion. The data processing system may transmit, over the communications network, the message to the workout device. The workout device may receive the message and aggregate the configuration change command and the configuration change criterion into a queue of one or more configuration change commands that is stored in a memory of the workout device. The workout device may then change operation according to the configuration change command in response to determining the configuration change criterion is satisfied. By doing so, the data processing system may not need to provide active real-time control of the workout device as the data processing system displays a video and the workout device can still adjust its configuration to correspond with the video. Thus, the operations may remove the latency that typically accompanies transmitting the signals to a cloud server and then back down to the workout device when communicating over Wi-Fi or another wireless network.

The data processing system connects to an intermediary server. The intermediary server may be a cloud server that is configured to store information about various pieces of workout equipment and enable computing devices to communicate with such pieces of workout equipment. The data processing system may connect to the intermediary server via a wireless communication interface (e.g., via a Wi-Fi communication interface). To do so, the data processing system may send a connection request to the intermediary server via an API. The intermediary server and the data processing system may perform a handshaking operation with each other. If the handshaking operation is successful, the data processing system and the intermediary server have successfully established a connection with each other.

The intermediary server maintains a "shadow state" of a piece of workout equipment. The shadow state may be or include information about the workout equipment such as connection status (e.g., whether the piece of workout equipment is currently connected to the intermediary server), product information (e.g., model name, part number, version number, hardware type, hardware revision, device type, serial number, etc.), error information (e.g., file name line, code, etc.), and warning information (e.g., file name, line, code, message). Different pieces of workout equipment may have different values in their respective shadow states. For example, a treadmill shadow state shall include setting values (e.g., speed range, grade range, etc.), current speed, current grade, current mode (e.g., idle, running, paused, deadman key is out, ready and waiting, etc.), odometer (e.g., distance the treadmill has moved over the treadmill's lifetime), time (e.g., in seconds) the current workout has been running, distance traveled in current workout, calories burned during the current workout, and the user's current heart rate. The intermediary serve may maintain shadow states with different values for different workout devices.

The data processing system subscribes to the shadow state of the workout device for which the data processing system is processing a workout video. To do so, the data processing system may retrieve a stored identifier of the piece of workout equipment from memory. The data processing system may generate a message including the stored identifier. An example of such a message is as follows:

Topic $aws / things / treadmill 123 /

> shadow / name / *DeviceState* / update / delta

The data processing system may transmit the message to the intermediary server to subscribe to the shadow state of the piece of workout equipment. By subscribing to the shadow state of the workout device, the data processing system may establish a connection with the workout equipment through the intermediary server. The data processing system subscribes to a commander topic that is associated with commanding the workout device. The commander topic may be a protocol that the data processing system can use to control the workout machine through the intermediary server. Using the commander topic, the data processing system may issue commands via an MQTT protocol such as:

treadmill 123 / commander / command where "treadmill123" is an example of a name of a device that the data processing system is controlling.

Via the commander topic, the data processing system may send instructional command messages to the workout device via the intermediary device (e.g., the data processing system may send commands to the intermediary device and the intermediary device may forward the configuration change commands to the workout device). Command messages may be JSON formatted messages. Command messages may define or include a seq_num (e.g., the sequential message number for the particular workout) and an action parameter. Additional properties may exist based on the value of the action property. Examples of action types that can be included in command messages are below with their corresponding descriptions:

request control—begins a control session. On success, returns a control session ID. Subsequent messages should start with sequence numbers beginning with 1. This command may generate a response message at the workout device.

release control—ends a control session. Releases control of the machine for other control clients to take charge. May require a session ID to send.

reset—resets all parameters, stops all motors, zeros grade/resistance, clears any queued set operations, and sets the machine to its "idle" state. This command may generate a response message at the workout device (e.g., by the workout device). The data processing system may issue this command to the workout device as the first step in starting a workout to clear any existing state and instructions on the workout device.

start—starts the machine by entering the "running" state, using any currently set speeds, resistance, grade, etc., and starting the duration timer, and allowing increments to distance and calories. This command may be used to both start and resume a workout. This command may generate a response message at the workout device. The data processing system may issue this command to engage the primary motor of the workout device.

pause—pauses the machine by entering the "paused" state, stopping the main motor, and pausing the duration timer, and locking calories and distance. This command may be used to stop a running machine, with the intent of resuming the workout in the immediate future. This command may generate a response message at the workout device.

set—sets parameters for speed, resistance, grade, etc., to be used when the machine is in a "running" state. This command may generate a response message at workout device when the set variables are to be set in the future as opposed to immediately.

clear—clears values from the execution queue.

The set configuration change command may include a values property which defines a set of properties and values (e.g., a workout device configuration) to be applied to the workout device upon execution of the configuration change command by the workout device. Examples of such values and/or properties include speed, grade, speed and grade, resistance, workout time, workout distance, calories, etc. In some cases, the set command includes a "when" property value that indicates when the configuration change command should be executed by the workout device. As described herein, the "when" property may be a configuration change criterion and/or may be a condition. Examples of types of when property values include time (e.g., the configuration change will be made at a set time) and distance (e.g., a configuration change distance in which the configuration change will be made when a user travels a set distance on his or her workout device).

In instances in which a message includes a configuration change criterion, the workout device may perform a comparison operation to determine when the configuration change criterion is satisfied. For instance, if a conditional property value of the configuration change criterion is equal to the current property value (e.g., the conditional property value of 5 miles is equal to a stored 5 miles traveled on the workout device), the workout device may execute the configuration change command identified in the message immediately. If the conditional property value is less than the current property value, the set values (e.g., configuration change command) of the message may be applied when the corresponding current value falls below the conditional property value. If the conditional property is greater than the current property value, the workout device may execute the configuration change command identified in the message when the current value rises above the conditional property value (e.g., if the value is a distance that is greater than the current distance traveled for the workout, the workout device may monitor the distance traveled against the conditional distance and execute workout device configuration when the current distance traveled exceeds the conditional property value).

In some embodiments, messages that include a configuration change criterion also include a step_num property. The step_num property may be an incrementing value that can be used to identify and prioritize set commands within a queue of commands. The step_num may have a few characteristics to operate properly. One characteristic may be that, in some instances, the step_num value must be greater than the smallest step_num within the queue, otherwise the current message or command may be ignored (e.g., not executed). Another characteristic may be that if the step_num of a message matches a step_num of a command that is currently in the queue, the configuration change command that corresponds to the step_num may be removed from the queue and replaced with the new message. Another characteristic may be that if a command cannot be saved, an error message describing the reason the configuration change command could not be saved to the queue may be sent to data processing system. If a message includes a "clear" action type, the message may also include a step_nums property value that defines which queue elements should be removed. If the message with the clear action type does not include any step_nums property values, all queue elements should be removed.

A request control command may be a request for control of the workout equipment. The request control command may be used to obtain the session identifier that can be used with future commands that the data processing sends the workout device during the control session. The request control command may only succeed if the workout device is in a ready and waiting state. If the data processing system receives a "NO PERMISSION" response to the request control command, the workout device may not be in the ready and waiting state, or another control session may already be active. The request control command may be the only command that does not require a sequence number or session identifier. In some embodiments, the request control command may include a "friendly name" field that contains a string indicating a name of the application of the data processing system that is requesting control of the workout equipment. The name may be limited to 64 bytes in length, in some cases.

An example request control command is below:
TABLE-US-00001 {"action": "request control", "friendly name": "Controller name"}

If a request control command succeeds (e.g., the workout device successfully receives the command and determines there is not another active control session), the workout device that received the request control command may send the data processing system an identifier for the control session. The identifier may be required to be sent in further messages to the workout device during the control session.

An example of a release control command is below:
TABLE-US-00002 {"seq_num": 100, "action": "release control" "id": "12345"}

An example of a message without a configuration change criterion is below:
TABLE-US-00003 {"seq_num": 4, "action": "set" "id": "12345", "values": {"speed": 10.0, "grade": 0.5}}

A workout device that receives the above message may immediately set its speed and incline values to the values set forth in the message. The workout device will do so immediately instead of after waiting for a condition to be satisfied because there is not a configuration change criterion in the message.

An example of a message with a reset command is below:
TABLE-US-00004 {"seq_num": 1, "action": "reset" "id": "12345"}

The reset command may instruct the workout equipment to 'reset' and sets the state of the workout equipment to 'idle.' This command may typically be sent as the first operation in starting a workout to clear any existing state and instructions before starting the machine.

An example of a message with configuration change criterion is below:
TABLE-US-00005 {"seq_num": 5, "action": "set" "id": "12345", "values": {"speed": 10.0, "grade": 0.5}, "when": {"step_num": 1, "distance": 50.0, "time": 120.0}}

A workout device that receives the above message may add the configuration change command to its queue in memory. The workout device may set its speed and incline to the values specified in the memory when either the specified distance or time is reached based on the message containing the conditional operation.

After sending a configuration change command to the workout device, the workout device may process the configuration change command. The workout device may respond to the configuration change command with a command response. Such responses may take the form:
TABLE-US-00006 "result": <string>, "command": <command>

Example response strings that can be filled in in the response messages with a corresponding description is below:

Result Description "SUCCESS" The configuration change command was either executed or saved for future execution successfully "INVALID" The configuration change command was invalid "NO MEM" There was not enough memory for the device to save the configuration change command for future execution "NO EFFECT" The issued configuration change command would not do anything. This could happen if a future set is issued but the time at which it would do something has already passed "NO PERMISSION" The controller does not have permission to control the device After successfully subscribing to the commander topic, the data processing system may wait for the workout device to be in the "ready and waiting" state. The data processing system may determine if the workout device is in such a state by identifying the current state of the workout device from the device's shadow state that is being maintained by the intermediary server. If the data processing system determines the workout device is not in the ready and waiting state, in some embodiments, the data processing system may monitor the shadow state on the intermediary device waiting for the shadow state to indicate the workout device in the ready and waiting state. In some embodiments, instead of monitoring the shadow state, the data processing system may poll the workout device at set intervals until the workout device transmits a message indicating the workout device is in a ready and waiting state.

In some cases, the workout device may only be in the ready and waiting state after a user interaction with the workout device. For example, a user may select an input button on the workout device that indicates the device is ready to receive commands from the intermediary device or directly from the data processing system. Upon receiving such an input, the workout device may transmit a message to the intermediary device and/or to the data processing system indicating the workout device is in a ready and waiting state. In instances in which the workout device transmits a message to the intermediary device, the intermediary device may update the shadow profile for the workout device. In such instances, the data processing system may identify the updated state from the shadow profile to determine the workout device is in a ready and waiting state. In instances in which the workout device transmits the message to the data processing system, the data processing system may identify the ready and waiting state from the message.

The data processing system sends a start workout command to the workout device. The data processing system may do so via the commander topic. In some embodiments, the data processing system sends the start workout command to the intermediary server and the intermediary server forwards the configuration change command to the workout device. The intermediary device may do so based on an identification of the workout device that the data processing system may include in the message. In some embodiments, the data processing system sends the start workout command directly to the workout device (e.g., via a Bluetooth signal or over the Internet via a Wi-Fi communication interface).

The data processing system waits for a response from the workout device. After transmitting the message with the start workout command, the data processing system may wait for a response from the workout device that indicates the start workout command was received successfully. If the data processing system receives a response indicating that the start command was unsuccessful (e.g., the start command could not be initiated) the data processing system may transmit another message with a start workout command. If the data processing system waits a predetermined amount of time without receiving a response to the start workout command, the data processing system may transmit another message with a start workout command. The data processing system may continue this loop until the data processing system transmits a start workout command and receives a successful response in return.

The data processing system generates a message with a configuration change command. The data processing system may generate the message with a configuration change using the commander topic as described above. To comply with the requirements of the MQTT protocol through which the data processing system may transmit the message, the data processing system may generate the message with only a single configuration change command. The configuration change command may be a command to change the configuration of the workout device. For example, the configuration change command may be to change the speed or incline of a treadmill or the resistance of a bicycle. The data processing system may generate the message with the configuration change command and an identification of the workout device such that the message may be routed through the intermediary server to the workout device. The data processing system may transmit the message with the configuration change command to the workout device. The data processing system may do so either directly or through the intermediary server.

In some instances, the data processing system includes a configuration change criterion in the generated message. The configuration change criterion may be the "when" property described above that indicates when the configuration change command in the same message should be implemented by the workout device. For example, the configuration change criterion may include an indication of a time during the workout to initiate the configuration change command (e.g., change the configuration of the workout device according to the configuration change command). In another example, the configuration change criterion may include a distance traveled within the workout device that indicates to initiate the configuration change command when the user performing the workout has traveled the requisite distance during the workout. Such distances may be determined based on sensor data within the workout device. In another example, the message may include two configuration change criteria. The two criteria may indicate only one of the configuration change criteria needs to be satisfied to implement the corresponding configuration change command in the message or both configuration change criteria need to be satisfied. Other examples of configuration change criteria include a coordinated universal time and a rep count.

In some embodiments, the data processing system synchronizes with the same external clock as the workout device to ensure the workout video and the workout device are accurately synchronized. For example, the data processing system may synchronize an internal clock with an external clock on an external server or other computing device (e.g., synchronize an internal clock with an external time source such as a server providing time using the NTP protocol). The data processing system may do so by retrieving the current time of a clock stored on the external server or other computing device and matching the data processing system's internal clock with the retrieved time. The workout device may similarly synchronize an internal clock stored within memory of the workout device with the same external clock as the data processing system. The workout device may synchronize its internal clock with the external clock upon each boot up or each time the workout device connects to the Internet. In some embodiments, the workout device may synchronize its internal clock with the external clock upon receiving a start command, a request for control command, or a synchronization command from the data processing system. Accordingly, the data processing system and the workout device may have synchronized internal clocks with each other.

The data processing system may determine a global configuration change command timestamp to include as a configuration change criterion in the message. The data processing system may determine the global configuration change command timestamp based on a start time of the workout video file, a configuration change timestamp from the workout video file, and the synchronized internal clock of the data processing system. The start time of the workout video file may be the real-world time (e.g., 2:00 PM GMT) that the data processing system is presenting the workout video or the time that a user requests to start the video. The configuration change timestamp may be a time within the workout video to implement the configuration change (e.g., 10 minutes into the video). To determine the global configuration change command timestamp, the data processing system may identify the start time of the workout video and the configuration change timestamp for a configuration change command in the workout video file. The data processing system may aggregate the configuration change timestamp with the start time of the workout video to determine a global configuration change command timestamp (e.g., add 10 minutes to 2:00 PM GMT to obtain a timestamp of 2:10 PM GMT). By doing so and because both the workout device and the data processing system are synchronized with the same external clock, the data processing system may generate a timestamp for the workout device to implement a configuration change that is dependent on an internal clock time instead of the time that is required for the data processing system to transmit a message to the workout device. Thus, the workout device may implement the configuration change that corresponds to the determined stamp without the latency issues that arise from the message signal transmission.

In some cases, the data processing system may not include any configuration change criterion in the message at all. Instead, the data processing system may only include a configuration change command. Such messages may indicate for the workout device to implement the data processing system immediately instead of waiting for any conditions to be satisfied.

After transmitting the message with the configuration change command and, in some cases, the configuration change criterion, the data processing system operates based on whether or not the configuration change command included a configuration change criterion. For example, if the message included a configuration change criterion, the data processing system may operate to confirm the workout device has enough memory to store the configuration change criterion and corresponding configuration change command in memory. The data processing system may do so by analyzing the response that the workout device receives from the workout device. If the data processing system determines the response indicates the workout device could not store the configuration change command and configuration change criterion because of a lack of memory (e.g., the response from the workout device included the string "NO MEM"), the data processing system may wait for a predetermined amount of time for the workout device to clear commands from memory (e.g., remove commands and corresponding configuration change criterion after the configuration change commands are implemented by the workout device). After the predetermined amount of time, the data processing system may resend or retransmit the message with the configuration change command and configuration change criterion to the workout device. The data processing system may repeat this loop until the data processing system receives a signal indicating the configuration change command can be added to the queue in memory.

The workout device may maintain a queue (e.g., a buffer) of configuration change commands and configuration change criteria in memory. The queue may include one or more configuration change commands for the workout device to execute during a workout. Because each configuration change command and corresponding configuration change criterion requires memory to store in the queue, the workout device may only be able to store a set amount of configuration change commands and configuration change criteria.

Upon receiving a message from the data processing system that includes a configuration change command and a configuration change criterion, the workout device may determine whether it has enough memory to store the configuration change command and the configuration change criterion in the queue. To do so, the workout device may evaluate the queue to determine if there are any empty slots. If the workout device determines there is an empty slot, the workout device may add the configuration change command and configuration change criterion to the queue and transmit a message to the data processing system indicating that the configuration change command could be added or was added to the queue. However, if the workout device determines there is not an empty slot, the workout device may transmit a message back to the data processing system indicating the workout device does not currently have the memory to add the configuration change command and the configuration change criterion to the queue.

In some cases, the workout device determines that the message does not contain a configuration change criterion and implements the configuration change command immediately. For example, the workout device may evaluate the message that the workout device receives from the data processing system. The workout device may only identify a configuration change command and determine there is not a configuration change criterion in the message. Based on the determination, the workout device may not add the configuration change command to the queue. The workout device may instead implement the configuration change immediately. After implementing the change, the workout device may transmit a signal to the data processing system or the intermediary server indicating the change was successful. By implementing the configuration change without adding the configuration change commands to the queue, the workout device can implement immediate configuration change commands even when there is not enough memory to add the configuration change command to the queue. Further, the workout device may implement the configuration change quicker because the workout device may not need to take the time to add the configuration change command to the queue and then retrieve the configuration change command from the queue for implementation.

The workout device may evaluate the configuration change criteria in the queue over time to determine when to implement the corresponding configuration change commands. For example, if a configuration change criteria includes a global configuration change command timestamp indicating a time to implement a configuration change command, the workout device (via the processor of the workout device) may compare the global configuration change command timestamp to the internal clock of the workout device and determine when the internal clock matches the global configuration change command timestamp. The workout device may determine the configuration change criterion that contains the global configuration change command timestamp is satisfied in response to the match and implement the configuration change command that corresponds to the global configuration change command timestamp. Because the data processing system and the workout device are synchronized with each other through the same external clock, the configuration change in the workout device may correspond to what is being presented on the workout video (e.g., the configuration change of increasing the incline of a treadmill will match an uphill incline being shown in the workout video). In another example, a configuration change criterion may include workout data from the workout that the user is performing. Such workout data may include a current speed that the user is running or a total distance that the user has run or traveled (which the workout device may have determined based on sensor data that generated by sensors on the workout device). The configuration change criterion may be satisfied when the user has run a set distance during the workout. The workout device may evaluate the total distance the user has run against the set distance of the configuration change criterion and determine the configuration change criterion is satisfied when the total distance that the user has run is equal to or exceeds the set distance of the configuration change criterion. The workout device may then implement the configuration change (e.g., transmit a control signal to a control mechanism of the workout device) that corresponds to the satisfied configuration change criterion.

In cases in which the data processing system transmits a message without a configuration change criterion to the workout device, the data processing system may receive a signal from the workout device indicating the change in configuration was successful or poll the intermediary server for the current state of the workout device to determine if the current state matches the configuration change command (e.g., determine if the current state indicates the configuration change command was implemented). For example, the data processing system may receive a current state of a treadmill indicating that the belt of the treadmill is moving at 5 mph. The data processing system may have just sent a message to the treadmill commanding the treadmill to move at 5 mph. The data processing system may compare the current state to the configuration change command. If the current state and the configuration change command match, the data processing system may determine the configuration change command was implemented successfully. If they do not match, the data processing system may determine the configuration change command has not been addressed yet and continue waiting for a message from the workout device or polling the intermediary server.

Once the data processing system determines the current state of the workout device has been updated, the data processing system may determine if there are any more commands to transmit to the workout device. The data processing system may do so by parsing the workout video file and determining if there are any further commands in the workout video file. If the data processing system identifies another command in the file, the data processing system may generate a message with the configuration change command and corresponding configuration change criterion, if any, and transmit the message to the workout device. The data processing system and the workout device may repeat the above loop until the data processing system determines there are not any more configuration change commands in the workout video file and/or until the data processing system determines the workout video from the file is finished. The data processing system may generate and send such messages as the data processes the workout video file and presents the workout video of the file on a display.

Upon determining there are not any more configuration change commands in the workout video file and/or the workout video from the file has finished, the data processing system clears the workout device's queue by transmitting a reset command to the workout device. The workout device may receive the reset command and remove any remaining configuration change commands and configuration change criteria from the queue. The workout device may transmit a signal back to the data processing system in response to the reset command. The transmitted signal may indicate that the queue has been cleared or that the request could not be completed. The data processing system may repeatedly send the reset command to the workout device until the data processing system receives a message indicating the reset was successful. After receiving a message indicating that the reset was successful, the data processing system may end the connection with the intermediary server and/or the workout device.

In some embodiments, the synchronization between the workout device and the data processing system (or the workout video that the data processing system is presenting) may be lost when the user performing the workout pauses the workout. For example, over the course of a workout, a user may pause the workout for a period of time. To do so, the user may press a pause button on the workout machine and/or the data processing system. In cases in which the user only presses a pause button on the workout machine, the workout machine may transmit a message indicating the pause to the data processing system. In cases in which the user only presses a pause button on the data processing system, the data processing system may transmit a pause command to the workout device. The user may then resume the workout by similarly selecting one or both of the data processing system and the workout device. When this occurs, the synchronization between the workout device and the data processing system may become off because the pause button did not pause the internal clocks of the data processing system or the workout device. Accordingly, the internal clocks may have shifted while the workout video remained paused and the global configuration timestamps of the configuration change criteria may no longer correspond to what is being displayed in the workout video.

To account for the above synchronization issues that may result from a paused workout, either the data processing system or the workout device may recalculate or determine a new global configuration change timestamp for each of the configuration change criteria that includes a global configuration change timestamp. To do so, the workout device or the data processing system may identify the length of the pause (e.g., a pause length) in the video. The workout device or the data processing system may then add the length of the pause to each of the global configuration change timestamps to determine a new global configuration change timestamp for each global configuration change timestamp that was in the queue. In embodiments in which the data processing system determines the configuration change timestamp, the data processing system may transmit new messages to the workout device that contain the new global configuration change timestamps and the configuration change commands that correspond to the timestamps. The data processing system may include the sequence number of the previous configuration change commands with the stale timestamps in the messages so the workout device will replace the configuration change commands that correspond to the stale global configuration change timestamps in the queue. In embodiments in which the workout device determines the new global configuration change timestamps, the workout device may replace the stale global configuration change timestamps with the new configuration change timestamps in the queue without receiving any new messages from the data processing system.

In some instances, the workout device may receive a configuration change command with a configuration change criterion that has already passed. For example, the data processing system may transmit a global configuration change timestamp of 3:00 PM GMT to the workout device with a configuration change command. The internal clock of the workout device may indicate that the current time is 3:30 PM GMT. The workout device may compare the global configuration change timestamp with the current time of the synchronized clock and determine the configuration change command cannot be executed because the current time is later than the timestamp. In response to the determination, the workout device may transmit a response message back to the data processing system that indicates the configuration change command could not take effect. The workout device may also discard the configuration change command and configuration change criterion to avoid the configuration change command and configuration change criterion from taking up memory on the workout device.

In some embodiments, the connection and control process between the data processing system and the workout device may differ. For example, instead of initiating the communication with workout device by sending a "start command" to the workout device, the data processing system may send the workout device a "request control" command. By sending such a command, the workout device may accept the request control command by responding with a session identifier that the data processing system must include in further communication messages with the workout device. If the data processing system sends the workout device a message without the session identifier, workout device may ignore and/or discard the message. Because the data processing system may be the only computing device that has the session identifier, the workout device may avoid receiving and processing messages from devices that are not a part of the control session.

Further in some embodiments, upon establishing a control session with the workout device, the data processing system may send the workout device a reset command to clear any queue of configuration commands and/or criteria that are currently stored in memory of the workout device. By doing so, the workout device may not errantly execute a workout command during an individual's workout. After sending such a reset command, the data processing system may send the workout device a start command to initiate the workout.

In embodiments in which the data processing system establishes a control session with the workout device, the data processing system may send a "release control" command to the workout device upon finishing playing a workout video or upon sending the workout device each configuration command and/or configuration criteria in the workout video file. Receipt of the release control command may cause the workout device to end the session and not accept any more messages from the data processing system for the session.

In addition to controlling workout equipment in the manner described herein, the data processing system may similarly control the configurations of beds or "smart beds." For example, the data processing system may control variables of a bed such as head position, foot position, rock intensity, and light state. The data processing system may also set settings on the bed such as head range, foot range, and rocking intensity. The data processing system may execute a bed control file with commands and configuration change criteria (e.g., configuration change timestamps) that causes the bed (e.g., a processor within the bed) to control the bed over time. Similar to synchronizing a workout device to a workout video, the data processing system may transmit bed configuration commands and configuration change criteria to a bed as the data processing system executes a bed control file. Examples of aspects of a bed that can be controlled via such commands include brace position and a spring state (e.g., whether one or more springs of the bed should be engaged). The bed may receive the configuration change command and act on the configuration change commands immediately or store the configuration change commands and corresponding configuration change criteria in a queue in a memory of the bed to be implemented once the applicable configuration change criterion is satisfied. The bed may be synchronized to the data processing system similar to the workout device as described above, so the data processing system may control the bed over the course of a night per a user's requirements. Thus, a user may control the configuration of their bed at night to improve their sleep.

Further, in some cases, the bed may store multiple bed control presets. Each preset may be stored in a different queue and may be created when the data processing system transmits the configuration commands and configuration change criteria to the bed. A user may set the presets and select which of the presets to use on a given night. Because each preset may include different configuration change commands, configuration change criteria, and configurations, the user can adjust how he or she wishes to sleep on a nightly basis.

An example sequence for adding a data from a workout video file to a queue for workout synchronization is described herein. In the sequence, a user that plans to work out on a workout device accesses a computer (e.g., an external computer to the workout device) and selects an option to participate in a workout using the workout device. The computer may identify the video workout file that corresponds to the selected workout and execute the workout video file. In doing so, the computer may present a workout video on a display and extract a configuration change command and/or a configuration change criterion that corresponds to the configuration change command. The computer may generate a message that includes a payload with the configuration change command and/or configuration change criterion. The computer may transmit the message to the workout device. The workout device can receive the message and add the configuration change command and/or configuration change criterion to a queue in memory. As the workout progresses, a processor of the workout device can determine whether the configuration change criterion has been satisfied. Responsive to the configuration change criterion being satisfied, the processor may identify the configuration change command associated with the configuration change (e.g., in the same configuration change pair in the queue) and retrieve the identified configuration change command. The processor may then adjust how the workout device is operating based on the configuration change command.

A summary of an example method for workout synchronization is described herein. A data processing system may establish a connection with a workout device over a communications network. The data processing system may do so by sending a synchronization packet to the workout device in a handshaking protocol or by transmitting a message to an intermediary server that is in communication with the workout device. The data processing system may transmit a message to the workout device to confirm the workout device is operable (e.g., powered on and/or in a ready and waiting state) and can receive messages.

The data processing system may execute a workout video file to display a workout video on a display. The workout video file may include a workout video (e.g., a video of an environment or an instructor providing workout instructions) and/or configuration change commands and configuration change criteria. By executing the workout video file, the data processing system may display or render the workout video from the workout video file on a display. For instance, the data processing system may be a tablet or smart television that plays the workout video on a screen of the tablet or smart television or a processor in communication with a device with a display (e.g., a television) that plays or renders the workout video.

The data processing system may retrieve a configuration change command and a configuration change criterion from the workout video file. As the data processing system displays the workout video on the display, the data processing system may retrieve a configuration change command and a configuration change criterion that corresponds to the configuration change command from the workout video file. For example, the configuration change command and configuration change criterion may be stored in a data structure (e.g., a relational table) in the configuration change file. The data processing system may retrieve or extract the configuration change criterion and configuration change command from the data structure.

The data processing system may generate a message comprising the configuration change command and the configuration change criterion. The data processing system may do so by formatting a message with the retrieved configuration change command and configuration change criterion into a format that is readable by the workout device and/or an intermediary server that communicates with the workout device. The data processing system may include an identifier of the workout device in the message such that the data processing system may transmit the message directly to the workout device over a network and/or the data processing system may transmit the message to an intermediary server that may receive and forward the message to the workout device. After the data processing system generates the message, the data processing system may transmit the message directly to the workout device or to the intermediary server to forward to the workout device.

The message may cause the workout device (e.g., a processor of the workout device) to aggregate the configuration change command and the configuration change criterion from the message into a queue. The queue may include one or more configuration change commands and be stored in a memory of the workout device. The workout device may continuously evaluate the configuration change criterion from the message against an internal clock of the workout device and/or sensor data that the workout device receives to determine when the configuration change criterion is satisfied. Upon determining the configuration change criterion is satisfied based on the comparison, the workout device may change operation according to the configuration change command.

A. A method for synchronizing exercise equipment with workout video files to reduce latency, comprising:

establishing, by a processor of a workout device, a connection with a computer over a communications network;

maintaining, by the processor, a queue of one or more configuration change commands and corresponding one or more configuration change criteria in memory;

receiving, by the processor, a message comprising the configuration change command and the configuration change criterion;

aggregating, by the processor, the configuration change command and the configuration change criterion into the queue;

determining, by the processor, the configuration change criterion has been satisfied; and changing, by the processor, operation of the workout device according to the configuration change command in response to the determining that the configuration change criterion is satisfied.

A1. The method of A, wherein aggregating the configuration change command and the configuration change criterion into the queue comprises:

determining, by the processor, that there is not enough memory to add the configuration change command and the configuration change criterion to the queue; and transmitting, by the processor, a message to the computer indicating the configuration change command and the configuration change criterion could not be added to the queue.

A2. The method of A1, wherein aggregating the configuration change command and the configuration change criterion into the queue further comprises:

receiving, by the processor, a second message comprising the configuration change command and the configuration change criterion;

determining, by the processor, there is enough memory to add the configuration change command and the configuration change criterion to the queue; and adding, by the processor, the configuration change command and the configuration change criterion to the queue in response to the determining that there is enough memory.

A3. The method of A2, further comprising:

prior to receiving the second message:

determining, by the processor, a second configuration change criterion was satisfied; and removing, by the processor, the second configuration change criterion and a corresponding second configuration change command from the queue.

A4. The method of any of A-A3, further comprising:

receiving, by the processor, an input indicating a workout video is paused;

determining, by the processor, a pause length in which the workout video remained paused;

determining, by the processor, a second global configuration change command timestamp by aggregating the pause length with a global configuration change command timestamp; and replacing, by the processor, the global configuration change command timestamp with the second global configuration change command timestamp in the queue.

A5. The method of any of A-A4, further comprising:

receiving, by the processor, a reset command from the workout device; and in response to the reset command, removing, by the processor, each configuration change command from the queue.

A6. The method of any of A-A5, wherein receiving the message from the workout device comprises receiving, by the processor, the message from the workout device via an intermediary server.

A7. The method of A, further comprising:

receiving, by the processor, a second message comprising a second configuration change command without a configuration change criterion; and changing, by the processor, operation of the workout device according to the second configuration change command immediately instead of adding the second configuration change command to the queue in response to the second message not including a configuration change criterion.

A8. The method of A7, further comprising:

transmitting, by the processor, an updated state of the workout device based on the change in operation of the workout device.

A9. The method of A8, wherein transmitting the updated state of the workout device comprises transmitting, by the processor, the updated state of the workout device to an intermediary server.

A10. The method of A8, wherein transmitting the updated state of the workout device comprises transmitting, by the processor, the updated state of the workout device to the computer.

A11. The method of any of A-A10, wherein receiving the message comprises receiving, by the processor, the message from the computer via an MQTT protocol.

A12. The method of any of A-A11, wherein the workout device is a treadmill.

A13. The method of any of A-A11, wherein the workout device is a rowing machine.

A14. The method of any of A-A11, wherein the workout device is a stationary bicycle.

A15. The method of any of A-A11, wherein the computer is a smart television or a tablet.

A16. The method of any of A-A15, wherein the computer is a device connected to a display via a wire.

A17. The method of any of A-A15, wherein the computer is a device wirelessly connected to a display via a wire.

A17. The method of any of A-A17, wherein the configuration change criteria comprises a distance traveled during a workout.

A18. The method of any of A-A17, wherein the configuration change criteria comprises a timestamp.

A19. The method of any of A-A18, further comprising:

establishing, by the processor, a connection with an external device; and synchronizing, by the processor, an internal clock of the processor with an external clock stored in the external device.

A20. The method of A19, wherein the configuration change criteria comprises a timestamp, further comprising:

comparing, by the processor, the timestamp to the synchronized internal clock; and wherein determining the configuration change criterion has been satisfied comprises determining, by the processor, the timestamp matches or is subsequent to a time on the synchronized internal clock.

A21. The method of any of A-A20, wherein the workout device is a smart bed.

A22. The method of A21, wherein the configuration change command comprises a command to change an orientation of a portion of the smart bed.

A23. The method of A, wherein the workout device is a treadmill and the configuration change criterion comprises a distance, further comprising:

receiving, by the processor from a sensor on the treadmill, one or more signals indicating the distance traveled of a belt on the treadmill;

wherein determining the configuration change criterion has been satisfied comprises determining, by the processor, the belt has traveled the distance based on the one or more signals.

A24. The method of A23, wherein the sensor is a resistive sensor.

A25. The method of A23, wherein the sensor is a motion sensor.

B. A system for synchronizing exercise equipment with workout video files to reduce latency, the system comprising a processor of a workout device, wherein the processor:

establishes a connection with a computer over a communications network;

maintains a queue of one or more configuration change commands and corresponding one or more configuration change criteria in memory;

receives a message comprising the configuration change command and the configuration change criterion;

aggregates the configuration change command and the configuration change criterion into the queue;

determines the configuration change criterion has been satisfied; and changes operation of the workout device according to the configuration change command in response to the determining that the configuration change criterion is satisfied.

B1. The system of B, wherein the processor aggregates the configuration change command and the configuration change criterion into the queue by:

determining, by the processor, that there is not enough memory to add the configuration change command and the configuration change criterion to the queue; and transmitting, by the processor, a message to the computer indicating the configuration change command and the configuration change criterion could not be added to the queue.

B2. The system of B1, wherein the processor aggregates the configuration change command and the configuration change criterion into the queue further by:

receiving, by the processor, a second message comprising the configuration change command and the configuration change criterion;

determining, by the processor, there is enough memory to add the configuration change command and the configuration change criterion to the queue; and adding the configuration change command and the configuration change criterion to the queue in response to the determining that there is enough memory.

B3. The system of B2, wherein prior to receiving the second message, the processor:

determines a second configuration change criterion was satisfied; and removes the second configuration change criterion and a corresponding second configuration change command from the queue.

B4. The system of any of B-B3, wherein the processor further:

receives an input indicating a workout video is paused;

determines a pause length in which the workout video remained paused;

determines a second global configuration change command timestamp by aggregating the pause length with a global configuration change command timestamp; and replaces the global configuration change command timestamp with the second global configuration change command timestamp in the queue.

B5. The system of any of B-B4, wherein the processor further:

receives a reset command to the workout device; and in response to the reset command, removes each configuration change command from the queue.

B6. The system of any of B-B5, wherein the processor receives the message from the workout device by receiving the message from the workout device via an intermediary server.

B7. The system of any of B-B6, wherein the processor further:

receives a second message comprising a second configuration change command without a configuration change criterion; and changes operation of the workout device according to the second configuration change command immediately instead of adding the second configuration change command to the queue in response to the second message not including a configuration change criterion.

B8. The system of any of B-B7, wherein the processor further:

transmits an updated state of the workout device based on the change in operation of the workout device.

B9. The system of any of B-B8, wherein the processor receives the message from the computer via an MQTT protocol.

B10. The system of any of B-B9, wherein the workout device is a treadmill.

B11. The system of any of B-B9, wherein the workout device is a rowing machine.

B12. The system of any of B-B9, wherein the workout device is a stationary bicycle.

B13. The system of any of B-B9, wherein the computer is a smart television.

B14. The system of any of B-B13, wherein the computer is connected to a display via a wire.

B15. The system of any of B-B13, wherein the computer is wirelessly connected to a display.

B16. The method of any of B-B15, wherein the configuration change criteria comprises a distance traveled during a workout.

B17. The system of any of B-B15, wherein the configuration change criteria comprises a timestamp.

B18. The system of any of B-B17, wherein the processor further:

establishes a connection with an external device; and synchronizes an internal clock of the processor with an external clock stored in the external device.

B19. The system of B18, wherein the configuration change criteria comprises a timestamp, wherein the processor further:

compares the timestamp to the synchronized internal clock; and wherein the processor further determines the configuration change criterion has been satisfied by determining the timestamp matches or is subsequent to a time on the synchronized internal clock.

B20. The system of B-B9, wherein the workout device is a smart bed.

B21. The system of B20, wherein the configuration change command comprises a command to change an orientation of a portion of the smart bed.

B22. The system of any of B-B21, wherein the workout device is a treadmill and the configuration change criterion comprises a distance, wherein the processor further:

receives, from a sensor on the treadmill, one or more signals indicating the distance traveled of a belt on the treadmill;

wherein the processor determines the configuration change criterion has been satisfied by determining the belt has traveled the distance based on the one or more signals.

B23. The system of B22, wherein the sensor is a resistive sensor.

B24. The system of B22, wherein the sensor is a motion sensor.

C. A method for synchronizing exercise equipment with workout video files to reduce latency, comprising:

establishing, by a processor of a computing device, a connection with a workout device over a communications network;

executing, by a processor, a workout video file to display a workout video on a display;

retrieving, by the processor, a configuration change command from the workout video file;

generating, by the processor, a message comprising the configuration change command; and transmitting, by the processor over the communications network, the message to the workout device, the message causing the workout device to change operation according to the configuration change command in response to determining there is not a configuration criterion in the message.

C1. The method of C, wherein the workout device is a treadmill.

C2. The method of C, wherein the workout device is a rowing machine.

C3. The method of C, wherein the workout device is a stationary bicycle.

C4. The method of any of C-C3, wherein the computer is a smart television.

C5. The method of any of C-C3, wherein the computer is connected to a display via a wire.

C6. The method of any of C-C3, wherein the computer is wirelessly connected to a display.

C7. The method of any of C-C6, further comprising:

establishing, by the processor, a connection with an external device; and synchronizing, by the processor, an internal clock of the processor with an external clock stored in the external device.

C8. The method of any of C or C4-C7, wherein the workout device is a smart bed.

D. A system for synchronizing exercise equipment with workout video files to reduce latency, the system comprising a processor of a workout device, wherein the processor:

establishes a connection with a workout device over a communications network;

executes a workout video file to display a workout video on a display;

retrieves a configuration change command from the workout video file;

generates a message comprising the configuration change command; and transmits, over the communications network, the message to the workout device, the message causing the workout device to change operation according to the configuration change command in response to determining there is not a configuration criterion in the message.

D1. The system of D, wherein the workout device is a treadmill.

D2. The system of D, wherein the workout device is a rowing machine.

D3. The system of D, wherein the workout device is a stationary bicycle.

D4. The system of D, wherein the workout device is a smart bed.

D5. The system of D-D4, wherein the computer is a smart television or a tablet.

D6. The system of D-D5, wherein the computer is connected to a display device including the display via a wire.

D7. The system of D-D5, wherein the computer is wirelessly connected to a display device including the display.

D8. The system of any of D-D7, wherein the processor further:

establishes a connection with an external device; and synchronizes an internal clock of the processor with an external clock stored in the external device.

E. A method for synchronizing workout equipment with a workout video file to reduce latency, comprising:

receiving, by a computing device, a request to play video data of a video file on a display;

retrieving, by the computing device from metadata of the video file, one or more configuration change commands, each configuration change command associated with a corresponding initial configuration change criterion;

adjusting, by the computing device for each of the one or more configuration change commands, the initial configuration change criterion based on a time of receipt of the request;

generating, by the computing device, a message comprising the one or more configuration change commands and the corresponding adjusted configuration change criteria; and transmitting, by the first computing device over a communications network, the message to a workout device, receipt of the message causing the workout device to execute each of the one or more configuration change commands in response to detecting the corresponding adjusted condition is satisfied.

E1. The method of E, wherein the workout device is a treadmill.

E2. The method of E, wherein the workout device is a rowing machine.

E3. The method of E1, wherein the workout device is a stationary bicycle.

E4. The method of any of E1-E3, wherein the workout device is a smart bed.

E5. The method of any of E-E4, wherein the computing device is a smart television or a tablet.

E6. The method of any of E-E4, wherein the computing device is connected to a display device including the display via a wire.

E7. The method of any of E-E4, wherein the computing device is wirelessly connected to a display device including the display.

E8. The method of any of E-E7, further comprising:

establishing, by the computing device, a connection with an external device; and synchronizing, by the computing device, an internal clock of the computing device with an external clock stored in the external device.

It is to be understood that any examples, values, graphs, tables, and/or data used herein are simply for purposes of explanation and are not intended to be limiting in any way. Further, although the present disclosure has been discussed with respect to dam monitoring, in other embodiments, the teachings of the present disclosure may be applied to similarly monitor other structures.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system for synchronizing exercise equipment with workout video files to reduce latency, the system comprising a processor of a workout device, wherein the processor:
    establishes a connection with a computer over a communications network;
    maintains a queue of one or more configuration change commands and corresponding one or more configuration change criteria in memory;
    receives a message comprising a configuration change command of the one or more configuration change commands and a configuration change criterion of the one or more configuration change criteria;
    aggregates the configuration change command and the configuration change criterion into the queue;
    determines the configuration change criterion has been satisfied; and
    changes operation of the workout device according to the configuration change command in response to determination that the configuration change criterion is satisfied.

2. The system of claim 1, wherein the processor aggregates the configuration change command and the configuration change criterion into the queue by:
    determining, by the processor, that there is not enough memory to add the configuration change command and the configuration change criterion to the queue; and
    transmitting, by the processor, the message to the computer indicating the configuration change command and the configuration change criterion could not be added to the queue.

3. The system of claim 2, wherein the processor aggregates the configuration change command and the configuration change criterion into the queue further by:
    receiving, by the processor, a second message comprising the configuration change command and the configuration change criterion;
    determining, by the processor, there is enough memory to add the configuration change command and the configuration change criterion to the queue; and
    adding the configuration change command and the configuration change criterion to the queue in response to determination that there is enough memory.

4. The system of claim 3, wherein prior to receiving the second message, the processor:
    determines a second configuration change criterion was satisfied; and
    removes the second configuration change criterion and a corresponding second configuration change command from the queue.

5. The system of claim 1, wherein the processor further:
    receives an input indicating a workout video is paused;
    determines a pause length in which the workout video remained paused;
    determines a second global configuration change command timestamp by aggregating the pause length with a global configuration change command timestamp; and
    replaces the global configuration change command timestamp with the second global configuration change command timestamp in the queue.

6. The system of claim 1, wherein the processor further:
    receives a reset command to the workout device; and
    in response to the reset command, removes each configuration change command from the queue.

7. The system of claim 1, wherein the processor receives the message from the workout device by receiving the message from the workout device via an intermediary server.

8. The system of claim 1, wherein the processor further:
    receives a second message comprising a second configuration change command without a respective configuration change criterion; and
    changes operation of the workout device according to the second configuration change command immediately instead of adding the second configuration change command to the queue in response to the second message not including the respective configuration change criterion.

9. The system of claim 1, wherein the processor further:
    transmits an updated state of the workout device based on changing operation of the workout device.

10. The system of claim 1, wherein the workout device is a treadmill a rowing machine, a stationary bicycle, or a smart bed.

11. The system of claim 1, wherein the workout device is a smart bed, and the configuration change command comprises a command to change an orientation of a portion of the smart bed.

12. The system of claim 1, wherein the computer is a smart television.

13. The system of claim 1, wherein the computer is connected to a display via a wire.

14. The system of claim 1, wherein the computer is wirelessly connected to a display.

15. The system of claim 1, wherein the configuration change criterion comprises a distance traveled during a workout, a timestamp, or both.

16. The system of claim 1, wherein the processor further:
    establishes the connection with an external device; and
    synchronizes an internal clock of the processor with an external clock stored in the external device.

17. The system of claim 16, wherein the configuration change criterion comprises a timestamp, wherein the processor further:
    compares the timestamp to the synchronized internal clock; and
    determines the configuration change criterion has been satisfied by determining the timestamp matches or is subsequent to a time on the synchronized internal clock.

18. The system of claim 1, wherein the workout device is a treadmill and the configuration change criterion comprises a distance, wherein the processor further:
    receives, from a sensor on the treadmill, one or more signals indicating the distance traveled of a belt on the treadmill; and
    determines the configuration change criterion has been satisfied by determining the belt has traveled the distance based on the one or more signals.

19. The system of claim 18, wherein the sensor is a resistive sensor or a motion sensor.

20. A method for synchronizing exercise equipment with workout video files to reduce latency, the method comprising:
    establishing a connection with a computer over a communications network;

maintaining a queue of one or more configuration change commands and corresponding one or more configuration change criteria in memory;

receiving a message comprising a configuration change command of the one or more configuration change commands and a configuration change criterion of the one or more configuration change criteria;

aggregating the configuration change command and the configuration change criterion into the queue;

determining the configuration change criterion has been satisfied; and changing operation of a workout device according to the configuration change command in response to determination that the configuration change criterion is satisfied.

* * * * *